(12) United States Patent
Liva et al.

(10) Patent No.: US 7,099,340 B2
(45) Date of Patent: Aug. 29, 2006

(54) ENHANCED CMTS FOR RELIABILITY, AVAILABILITY, AND SERVICEABILITY

(75) Inventors: Valentino Liva, Los Altos, CA (US); Alok Sharma, San Jose, CA (US); Lance Smith, San Jose, CA (US); James Yee, Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 993 days.

(21) Appl. No.: 10/033,383

(22) Filed: Oct. 24, 2001

(65) Prior Publication Data

US 2002/0093966 A1 Jul. 18, 2002

Related U.S. Application Data

(63) Continuation-in-part of application No. 09/800,397, filed on Mar. 5, 2001, and a continuation-in-part of application No. 09/715,992, filed on Nov. 16, 2000.

(60) Provisional application No. 60/294,656, filed on May 30, 2001, provisional application No. 60/187,194, filed on Mar. 6, 2000.

(51) Int. Cl.
*H04L 12/28* (2006.01)
*H04L 12/56* (2006.01)
*H05K 5/00* (2006.01)
*H05K 7/00* (2006.01)

(52) U.S. Cl. .............................. 370/401; 361/679

(58) Field of Classification Search ........ 370/400–401; 710/1, 100; 361/679, 724
See application file for complete search history.

(56) References Cited

U.S. PATENT DOCUMENTS 5,361,091 A 11/1994 Hoarty et al.

(Continued)

OTHER PUBLICATIONS

PICMG, "CompactPCI", no date. Retrieved from the Internet:<URL: http://www.picmg.org/compactpci.stm>.*

(Continued)

*Primary Examiner*—Chi Pham
*Assistant Examiner*—Kevin C. Harper
(74) *Attorney, Agent, or Firm*—Harrity Snyder LLP

(57) ABSTRACT

A Cable Modem Termination System (CMTS) is partitioned into Line Cards, I/O Cards, and a midplane to provide enhanced Reliability, Availability, and Serviceability. Each I/O Card provides a cabling interface for coupling an assigned Line Card to other portions of a Hybrid-Fiber-Coax Network. A plurality of RF signals is coupled via connectors between each Line Card and a corresponding I/O Card, via the midplane. This permits a Line Card to be removed for servicing without requiring recabling of the corresponding I/O Card. Preferably, a rectangular-multi-pin collinear connector-cascade (Line Card jack, midplane double-plug, and I/O Card jack) is used to couple the plurality of RF signals. The connector-cascade is configured with protective RF ground pins adjacent and surrounding each of a plurality of RF signal pins. This approach permits each Line Card to be removed or inserted in a single action, without attention to individual RF interconnects, yet meets all system RF requirements while using relatively inexpensive connectors. The I/O Cards preferably include a distributed backup bus that permits one of the Line Cards in the CMTS to serve as a designated backup. The backup bus enables assignment of the designated backup Line Card to the I/O Card associated with a failing Line Card, without requiring recabling of any I/O Card. In conjunction with a signal processing architecture that permits dynamically programmable channel assignments, the backup bus facilitates rapid and fully automated failover. The Line Cards are preferably further partitioned into easily replaceable sections, including IF-to-RF and signal processing modules.

25 Claims, 24 Drawing Sheets

U.S. PATENT DOCUMENTS

| | | |
|---|---|---|
| 5,528,582 A | 6/1996 | Bodeep et al. |
| 5,533,023 A | 7/1996 | Ohlson et al. |
| 5,590,156 A | 12/1996 | Carney |
| 5,768,682 A | 6/1998 | Peyrovian .................. 725/128 |
| 5,841,468 A | 11/1998 | Wright |
| 5,878,325 A | 3/1999 | Dail |
| 5,903,550 A | 5/1999 | Spock |
| 5,930,231 A | 7/1999 | Miller et al. |
| 6,021,158 A | 2/2000 | Schurr et al. |
| 6,088,399 A | 7/2000 | Luz et al. |
| 6,160,572 A | 12/2000 | Matsuura |
| 6,233,235 B1 | 5/2001 | Burke et al. |
| 6,236,678 B1 | 5/2001 | Horton, Jr. et al. |
| 6,263,195 B1 | 7/2001 | Niu et al. |
| 6,282,184 B1 | 8/2001 | Lehman et al. |
| 6,356,374 B1 | 3/2002 | Farhan |
| 6,449,071 B1 | 9/2002 | Farhan et al. |
| 6,452,424 B1 | 9/2002 | Shamlou et al. |
| 6,519,773 B1 | 2/2003 | Ahmed et al. |
| 6,574,797 B1 | 6/2003 | Naegeli et al. |
| 6,608,837 B1 | 8/2003 | Brodigan |
| 6,650,624 B1 | 11/2003 | Quigley et al. |
| 6,721,371 B1 | 4/2004 | Barham et al. |
| 6,768,722 B1 | 7/2004 | Katseff et al. .............. 370/260 |
| 6,778,525 B1 | 8/2004 | Baum et al. ................ 370/351 |
| 6,826,195 B1 * | 11/2004 | Nikolich et al. ............ 370/465 |
| 2002/0012232 A1 * | 1/2002 | Creason et al. ............ 361/727 |

OTHER PUBLICATIONS

Kontron, "cPCI-DT64", Aug. 2004. Retrieved from the Internet:<URL: http://www.kontron-nordic.com/downloads/manual/M6006_TECH_1_Doc_V1_4.pdf>.*

US International Search Authority, International Search Report, PCT/USO1/45799, Mailed May 3, 2002, Washington, D.C. 20231.

Alok Sharma, co-pending U.S. Appl. No. 09/800,397, filed Mar. 5, 2001, entitled "Transceiver Channel Bank with Reduced Connector Density", 45 pp.

Valentino Liva et al., co-pending U.S. Appl. No. 09/715,992, filed Nov. 16, 2000, entitled "Methods and Apparatus for Transmission of Analog Channels Over Digital Packet Networks", 57 pp.

"Data-Over-Cable Service Interface Specifications: Radio Frequency Interface Specification", SP-RFIv1, 1-I03-991105, 1999 Cable Television Laboratories, Inc., 382 pp.

* cited by examiner

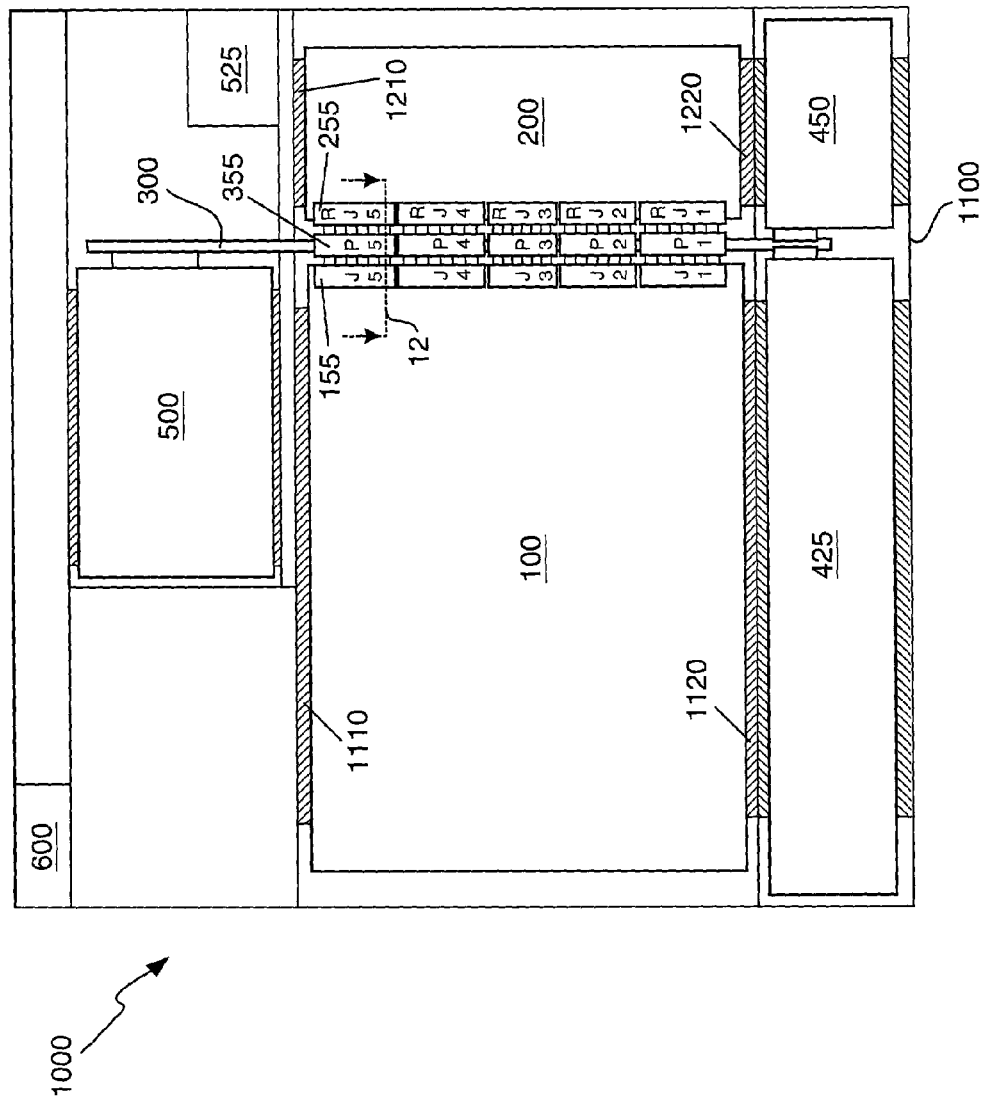

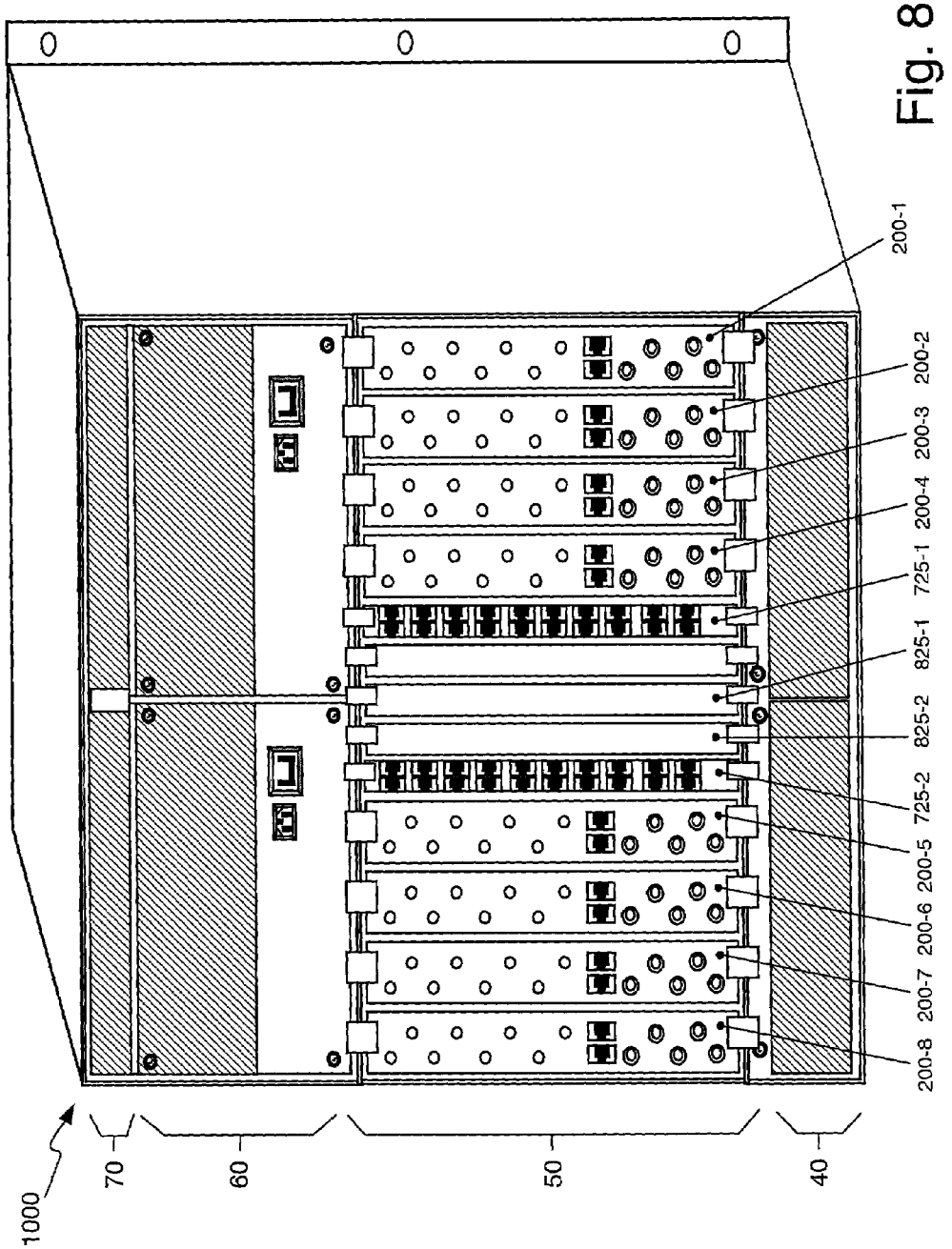

US 7,099,340 B2

ENHANCED CMTS FOR RELIABILITY, AVAILABILITY, AND SERVICEABILITY

CROSS REFERENCE TO RELATED APPLICATIONS

This application is a Continuation-in-Part of the following patent applications, the disclosures of which are herein incorporated by reference for all purposes:

U.S. patent application Ser. No. 09/715,992, entitled "METHODS AND APPARATUS FOR TRANSMISSION OF ANALOG CHANNELS OVER DIGITAL PACKET-BASED NETWORKS," Liva et al., filed Nov. 16, 2000; and U.S. patent application Ser. No. 09/800,397, entitled "TRANSCEIVER CHANNEL BANK WITH REDUCED CONNECTOR DENSITY," Alok Sharma, filed Mar. 5, 2001, which in turn claims priority to U.S. Provisional Patent Application Ser. No. 60/187,194, entitled "FREQUENCY AGILE DIGITAL TRANSCEIVER BANKS HAVING NON-UNIFORM CHANNEL WIDTH AND REDUCED CONNECTOR DENSITY," Alok Sharma, filed Mar. 6, 2000;

this application also claims priority to the following patent application, the disclosure of which is incorporated by reference for all purposes:

U.S. Provisional Patent Application Ser. No. 60/294,656, entitled "I/O CARD," Wingfield et al., filed May 30, 2001.

This application also incorporates by reference the following patent applications: Ser. No. 10/033,378, entitled "ENHANCED FIBER NODES WITH CMTS CAPABILITY," Liva et al., filed Oct. 24, 2001; and U.S. patent application Ser. No. 09/974,030, entitled "MULTIPLE INPUT, MULTIPLE OUTPUT CHANNEL, DIGITAL RECEIVER TUNER," Fabien Buda, filed Oct. 10, 2001.

BACKGROUND

Cable Modem Termination Systems (CMTSs) play important roles in cable networks, delivering integrated data, telephony and video to subscribers over regional and last mile Hybrid Fiber-Coax (HFC) networks.

CMTS Reliability, Availability, and Serviceability (RAS) is a concern for network vendors, as failure or performance degradation of key components can entail both downtime for network subscribers, as well as costly service time to make repairs. The large number of cables that connect to a typical Line Card—the CMTS component with primary processing functionality—to provide upstream and downstream channels makes for a lengthy recabling process when the card needs to be serviced. Disconnecting and reconnecting so many cables is also prone to error, further increasing the time associated with CMTS maintenance.

Another costly maintenance area is the adjustment of upstream and downstream channel assignments, such as done for noise abatement or when configuring a replacement or backup Line Card. Previously, this has been manually performed at the physical site of the CMTS, placing further demands on service technicians to make time-consuming and error-prone adjustments to a CMTS.

SUMMARY

The present invention teaches CMTS implementations that provide enhanced Reliability, Availability, and Serviceability. In an illustrative embodiment, the CMTS is partitioned into Line Cards, I/O Cards, and a midplane, and organized and operated in a manner that reduces maintenance errors, minimizes downtime as perceived by the subscriber, and shortens and simplifies maintenance.

Each I/O Card provides a cabling interface for coupling an assigned Line Card to other portions of a Hybrid-Fiber-Coax Network. The configuration of the network cabling for the I/O Card is custom to each Line Card. Carrying out the network cabling configuration is thus a time consuming and error prone manual operation requiring a trained technician. In accordance with the invention, a standardized interface is defined to couple a plurality of RF signals between each Line Card and a corresponding I/O Card, via the midplane. The standardized interface isolates the Line Card from the custom network-cabling configuration that the I/O Card sees, and permits the Line Card to be removed for servicing and its replacement reinserted, without revisiting the undesirable manipulation of the cabling of the corresponding I/O Card.

To enable RF signals to be passed between the Line Card and I/O Card, via the midplane, the inventors discovered a connector-based transmission approach that has signal integrity and impedance properties normally associated with coaxial cables and coaxial connectors, while avoiding these expensive components. Specifically, a multi-pin collinear connector-cascade (Line Card jack, midplane double-plug, and I/O Card jack) is employed, having in cross-section an array of conductors, and wherein each RF signal in the array is surrounded by protective RF grounds.

In a preferred embodiment, a rectangular-multi-pin connector of the compact-PCI (cPCI) connector standard is chosen, and 8 pins connected to RF ground surround each RF signal on the rank, file, and diagonals. The cPCI connector chosen has sufficient numbers of rows and columns of pins, that a plurality of RF signals may be coupled via the same connector. This permits each Line Card to be removed or inserted in a single action, without attention to individual RF interconnects, while meeting all system RF requirements.

The inventors discovered that a cPCI connector-cascade configured as described presents a negligible impedance discontinuity when used to pass RF signals as part of an industry standard 75-ohm transmission line. The inventors further discovered that all signal integrity and other system RF requirements (including cross-talk, susceptibility, and emissions requirements) of the CMTS are achievable using the cPCI connector-cascade to pass a plurality of RF signals between the Line Card and the I/O Card.

The I/O Cards preferably include a distributed backup bus that permits one of the Line Cards in the CMTS to serve as a designated backup. The backup bus enables assignment of the designated backup Line Card to the I/O Card associated with a failing Line Card, without requiring recabling of any I/O Card.

The Line Cards preferably use a signal processing architecture that permits dynamically programmable channel assignments. This eliminates the need for technician-performed field configuration of each Line Card for its associated upstream and downstream channel assignments. These assignments may be re-programmed at any time locally, remotely, or automatically, for a variety of purposes including dynamic noise abatement and maintenance.

In conjunction with the ability to dynamically program channel assignments, the backup bus facilitates rapid and fully automated failover. Upon failure of a Line Card, monitoring circuitry detects the fault, configures the designated backup Line Card to assume the channel assignments of the failed Line Card, and redirects the information streams of the I/O Card to the designated backup Line Card. The automated failover does not require involvement of maintenance personnel and minimizes the service downtime experienced by the subscriber.

The Line Cards are preferably further partitioned into easily replaceable sections, including a detachable module for optional IF-to-RF functionality and a detachable daughter card for the signal processing functions. Two different implementations are taught for connecting the Line Card to the IF-to-RF module, one using Line Card and module complementary pairs of push-on-mating (including slide-on and snap-on, and preferably self-aligning) coaxial-connectors, and another providing the Line Card to module interconnect through coaxial cables.

NOMENCLATURE

In the communications industry certain common terms find repeated application at different levels of the design hierarchy and otherwise may be used with varying scope. As a result, it is possible that terms used in this application have multiple context dependent meanings. Particular attention is required with regard to the terms demodulator, receiver, tuner, and front-end. Those skilled in the art will always be able to readily ascertain the correct meaning from careful study of the text and accompanying drawings.

Note that both analog RF and packet data transmissions may be carried over either electrical or optical paths. Furthermore, note that analog RF transmissions include digital modulation methods, including the DOCSIS compatible techniques for communicating between the CMTS and subscriber cable modems.

BRIEF DESCRIPTION OF DRAWINGS

FIG. 7 provides internal detail in a cut-way side view of the CMTS 1000 of FIG. 6, showing the arrangement of various Line Cards 100 and I/O Cards 200 relative to a midplane 300, which is shown cross-section.

FIG. 8 illustrates an external rear view of the CMTS 1000 of FIG. 1, in accordance with the present invention, including I/O Cards (200-1 through 200-8).

FIG. 9A is a side view that illustrates the PCB form factor. FIG. 9B is a rear view that illustrates the connectors for various cable attachments.

FIG. 14A is a map showing functional assignments for each receptacle of the J5 connector, while FIG. 14B provides a legend for the different ground types represented in the map of FIG. 14A.

FIG. 19B includes the connectors 1913, which mate with the connectors 1813 of FIG. 18.

FIG. 20(A) shows the Line Card 100 without a IF-to-RF module. FIG. 20(B) shows the Line Card with the IF-to-RF module 110 of FIG. 19 attached.

DETAILED DESCRIPTION

Those skilled in the art will understand that with appropriate adaptations the CMTS 1000, in accordance with the present invention, may be deployed at any of the major nodes within regional Hybrid Fiber-Coax Network HFCNs 3000, including at either of two types of Fiber Nodes (FN1 3400 and FN2 3500), or within the Fiber Node Hubs FNH 3300, the Primary Head End 3100, or the Secondary Head End 3200. The FN2s are more widely known as mini-FNs or mFNs. Compared to the larger FN1 type fiber nodes, FN2 type fiber nodes are located closer to a smaller number of subscribers, and provide a fiber overlay onto an otherwise conventional coaxial-cable distribution network. Fiber Nodes incorporating the CMTS 1000 are herein referred to as enhanced Fiber Nodes (eFNs), as exemplified by the eFN 5000 of FIG. 1(A). Additional illustrative detail of various aspects of the eFN and its CMTS is available in the following applications (previously incorporated by reference, above): "ENHANCED FIBER NODES WITH CMTS CAPABILITY," "TRANSCEIVER CHANNEL BANK WITH REDUCED CONNECTOR DENSITY," and "MULTIPLE INPUT, MULTIPLE OUTPUT CHANNEL, DIGITAL RECEIVER TUNER."

For the purpose of this application, from the perspective of the CMTS 1000, system applications are referred to as last-mile embodiments for those applications wherein the downstream side of the CMTS 1000 is coupled primarily to a subscriber subnet. This corresponds typically to placement of the CMTS 1000 at an FN1 or FN2. System applications are referred to as intermediate-node embodiments for those applications wherein the downstream side of the CMTS 1000 is coupled primarily to a sub-net of FNs. System applications are referred to as Head End embodiments for those applications wherein the CMTS 1000 is located at a primary or secondary Head End. The CMTS 1000 also facilitates the splitting of system-level CMTS functionality across multiple levels of the HFCN hierarchy. E.g., CMTS functions in general, and CMTS 1000 more particularly, may exist both at the head-end and within fiber nodes. Thus hybrid system applications of CMTS 1000 are possible and likely.

In accordance with the present invention, the CMTS 1000 offers the opportunity to use packet data transmissions within the portion of the HFCN that is upstream of the CMTS 1000 to carry significant portions of the upstream and downstream DOCSIS and non-broadcast services traffic. This reduces the number and length of analog RF paths required in the HFCN, and hence can dramatically reduce the infrastructure costs per cable modem.

Figure 3:
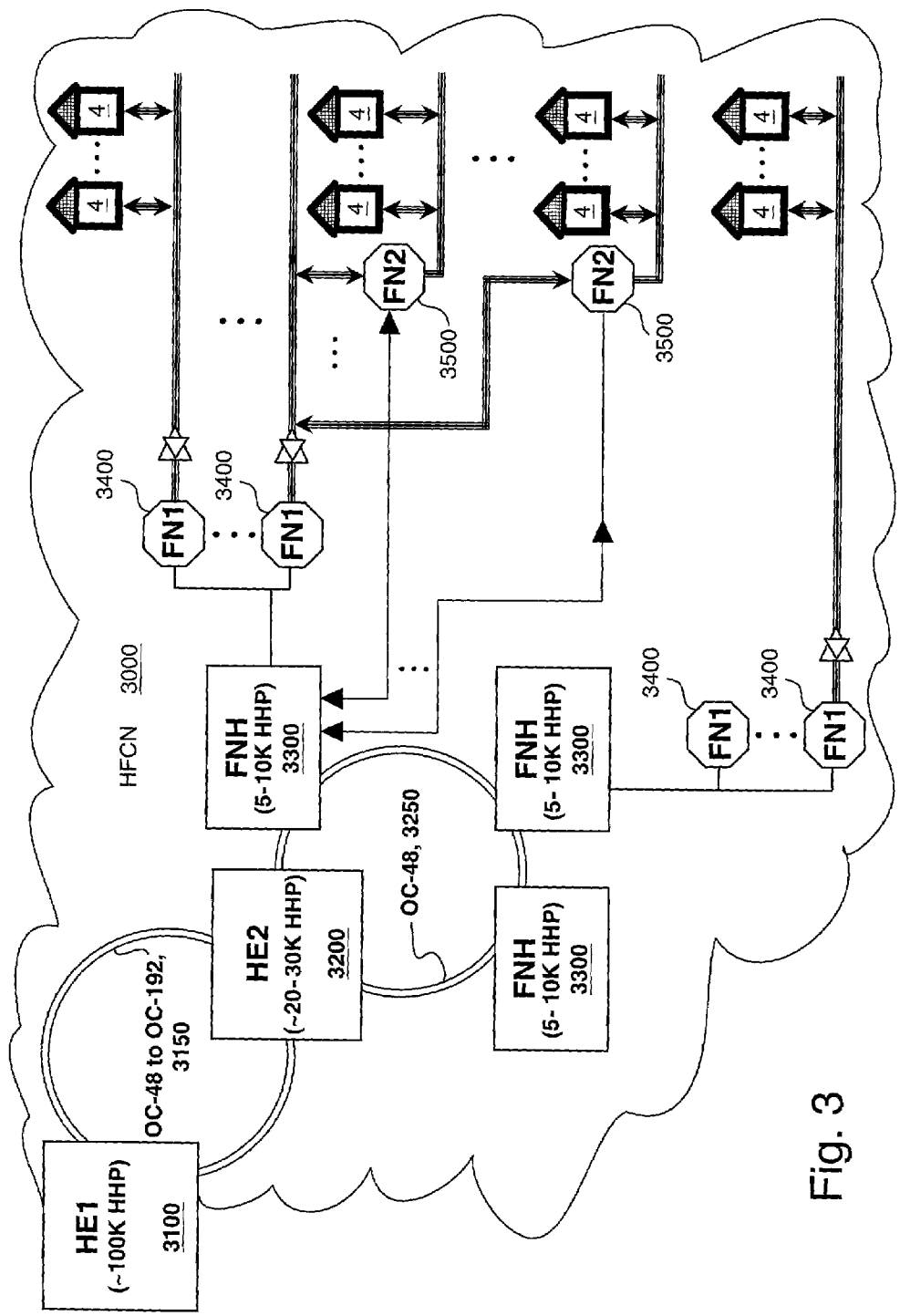
FIG. 3 illustrates a regional Hybrid Fiber-Coax Network (HFCN, 3000) 17 incorporating two types of Fiber Nodes (FN1, 3400 and FN2, 3500), and wherein the eFN 5000 of FIG. 1 finds multiple applications.

The role of Fiber Nodes within a last-mile embodiment will now be examined in conjunction with FIG. 3. Either type of fiber node (FN1 or FN2) may be enhanced with a CMTS to serve as the interface between the coaxial network that covers the "last mile" to subscribers' cable modems, and a set of services provided over a mixed network of coax, analog optical fiber and fiber carrying packet traffic.

Figure 4:
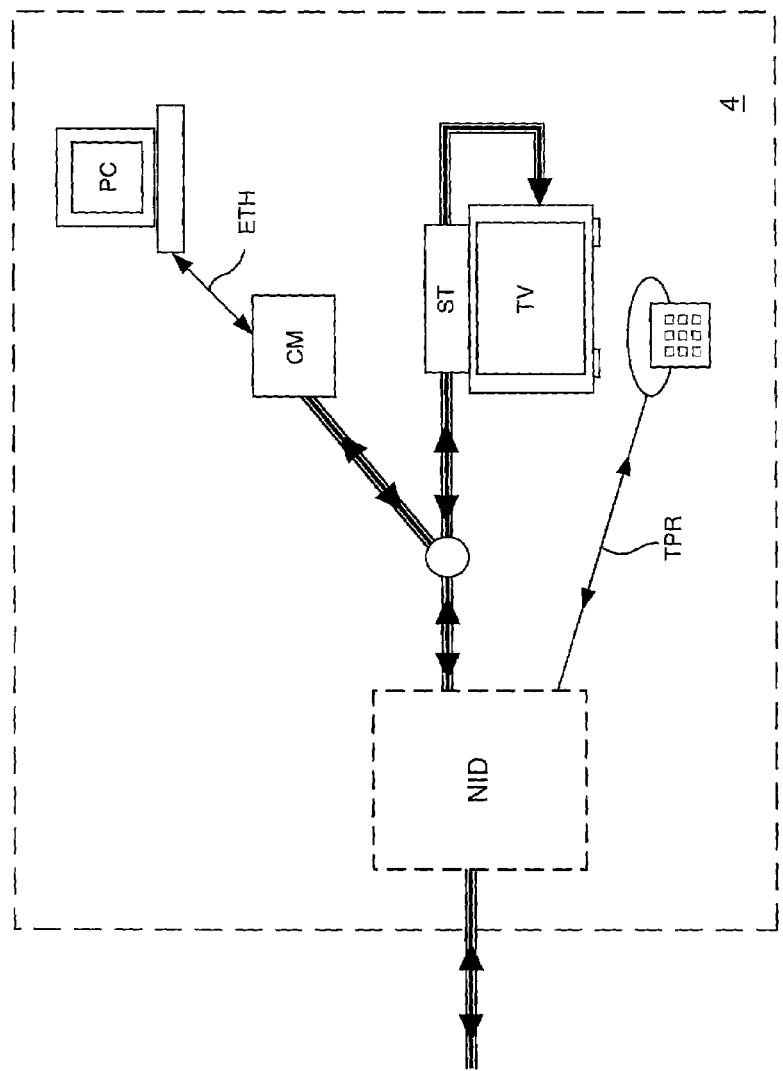
FIG. 4 provides an abstract drawing detailing prior-art Customer Premises Equipment (CPE, 4), typical to the households of FIG. 3.
Figure 5:
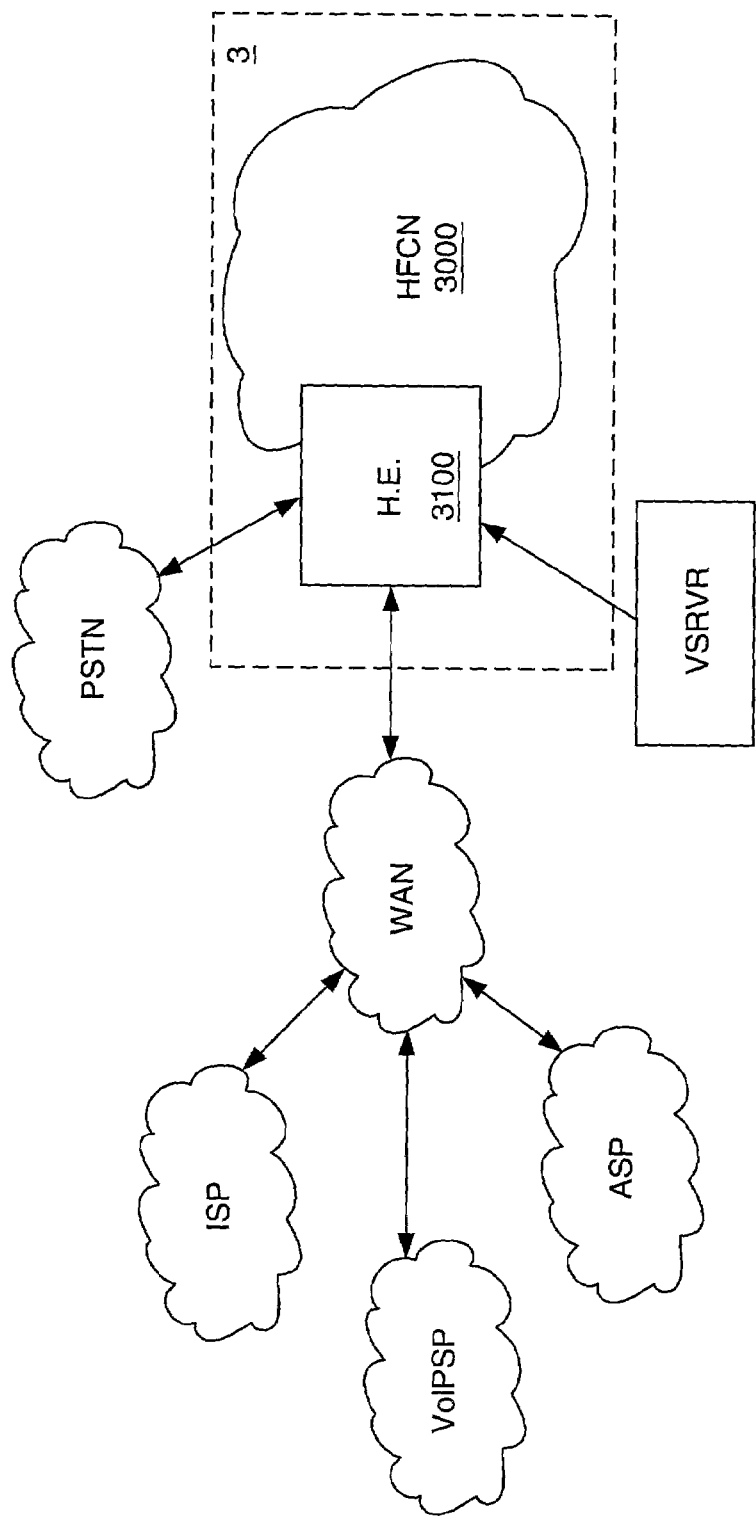
FIG. 5 illustrates conceptually the relationship of the HFCN 3000 of FIG. 3 to other networks and services.

The Customer Premises Equipment (CPE) at each subscriber residence 4 is illustrated in FIG. 4, which shows how network services pass information to and from cable modems, telephone modems, and TV set top boxes. The eFN couples the CPE to upstream services, such as shown in FIG. 5, connecting subscribers through the HFCN 3000 to a variety of Wide Area Network (WAN) services (e.g. Internet Service Providers, VoiceOverIP Service Providers, Application Service Providers) as well as information from Video Servers and the Public Switched Telephone Network (PSTN).

CMTS Functional Overview

Figure 1:
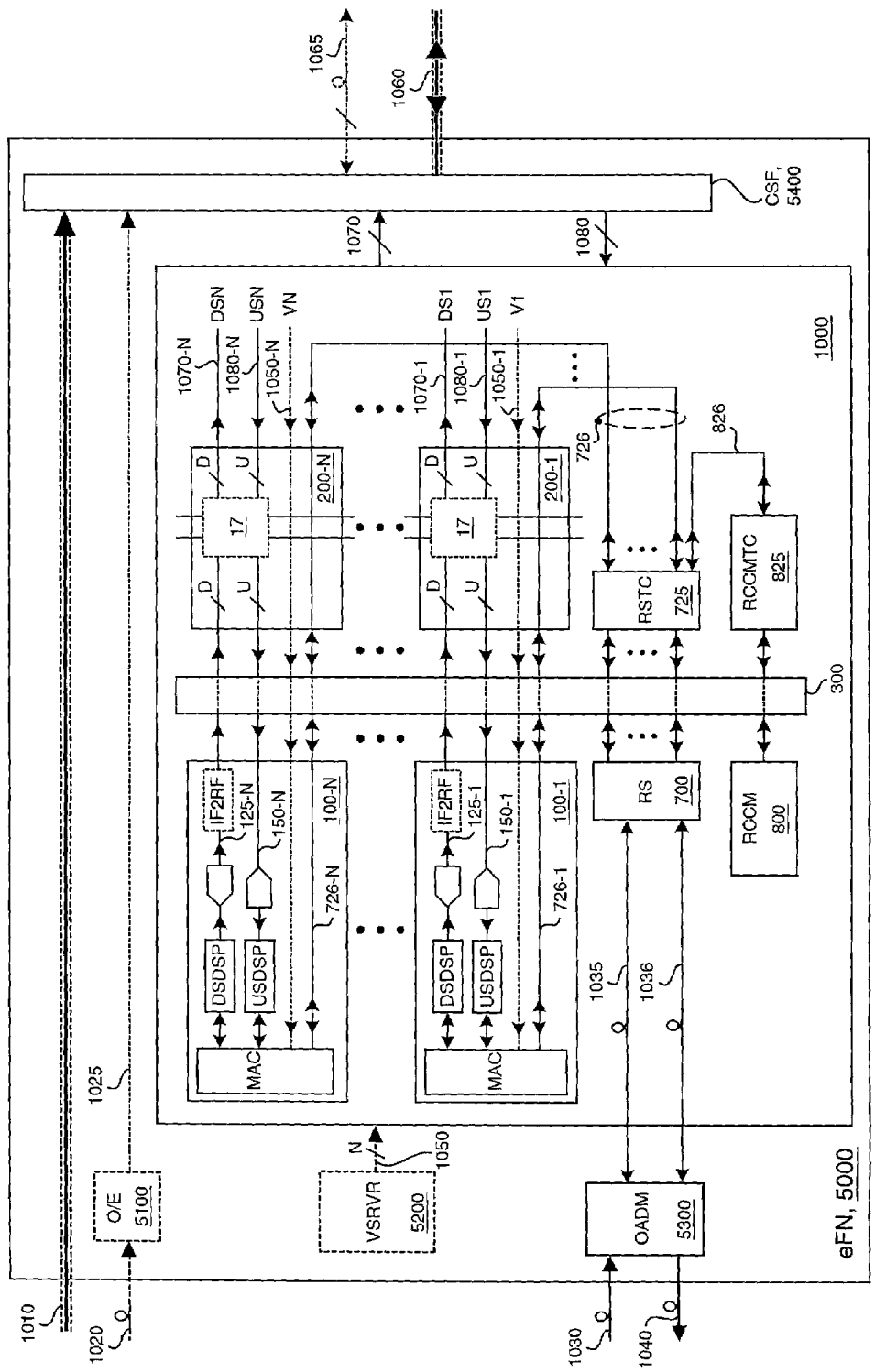
FIG. 1(A) provides an abstract drawing of an illustrative enhanced Fiber Node (eFN, 5000) in accordance with the invention.
FIG. 1(B) provides additional detail of one of the Line Cards 100, of FIG. 1(A).
Figure 1:
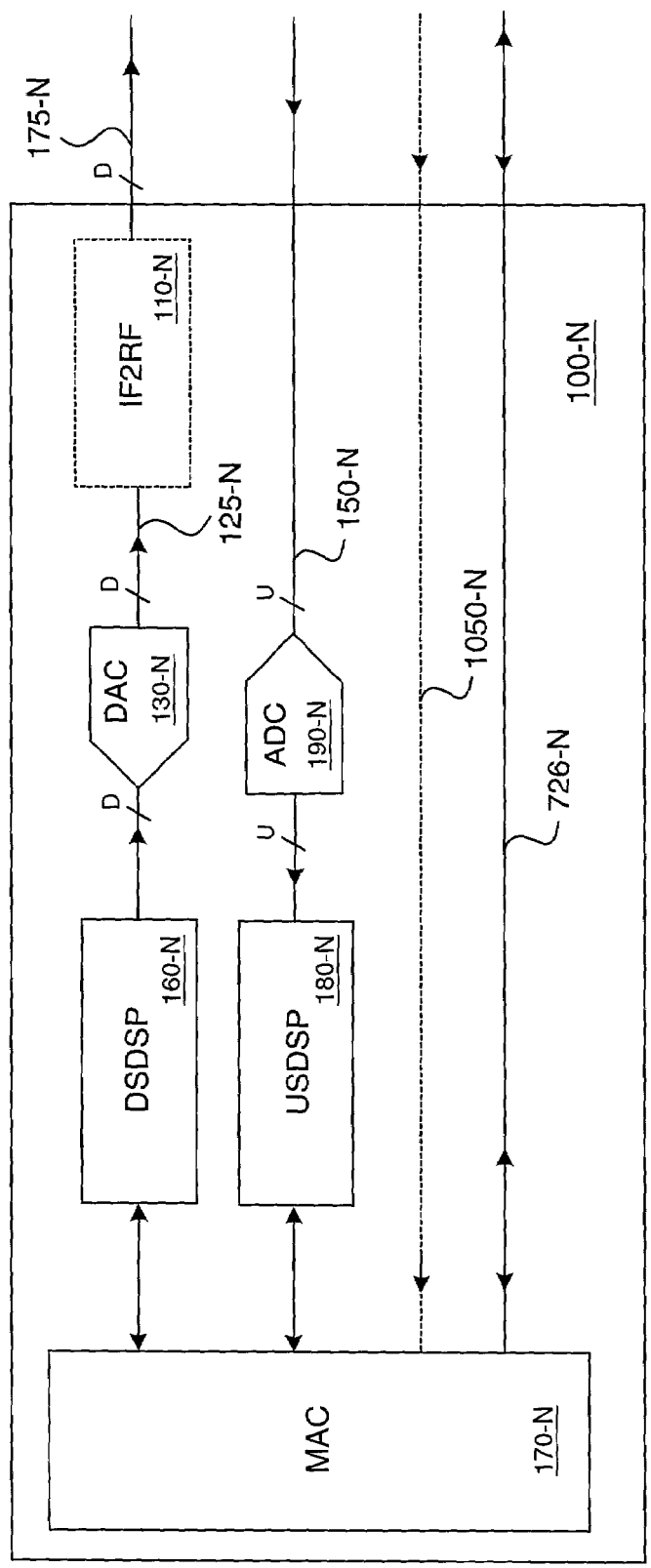

The CMTS 1000 of FIG. 1(A) has data interactions with a variety of potential sources and destinations, including traffic with network nodes upstream of the CMTS (toward the head end), traffic with network nodes downstream of the CMTS (toward the subscriber), and streaming video from local video servers. The CMTS preferably communicates with the nodes upstream in the network via redundant fiber-based packet links 1035 and 1036 using a protocol such as Gigabit Ethernet. The CMTS communicates with the nodes downstream in the network via DOCSIS compatible RF channels carried on upstream RF transmission paths (collectively, 1080) and downstream RF transmission paths (collectively, 1070). The CMTS also optionally inserts MPEG2-TS video 1050 from video servers VSRVR 5200 (local to the FN where the CMTS resides) into the RF spectrum provided to nodes downstream.

Figure 2:
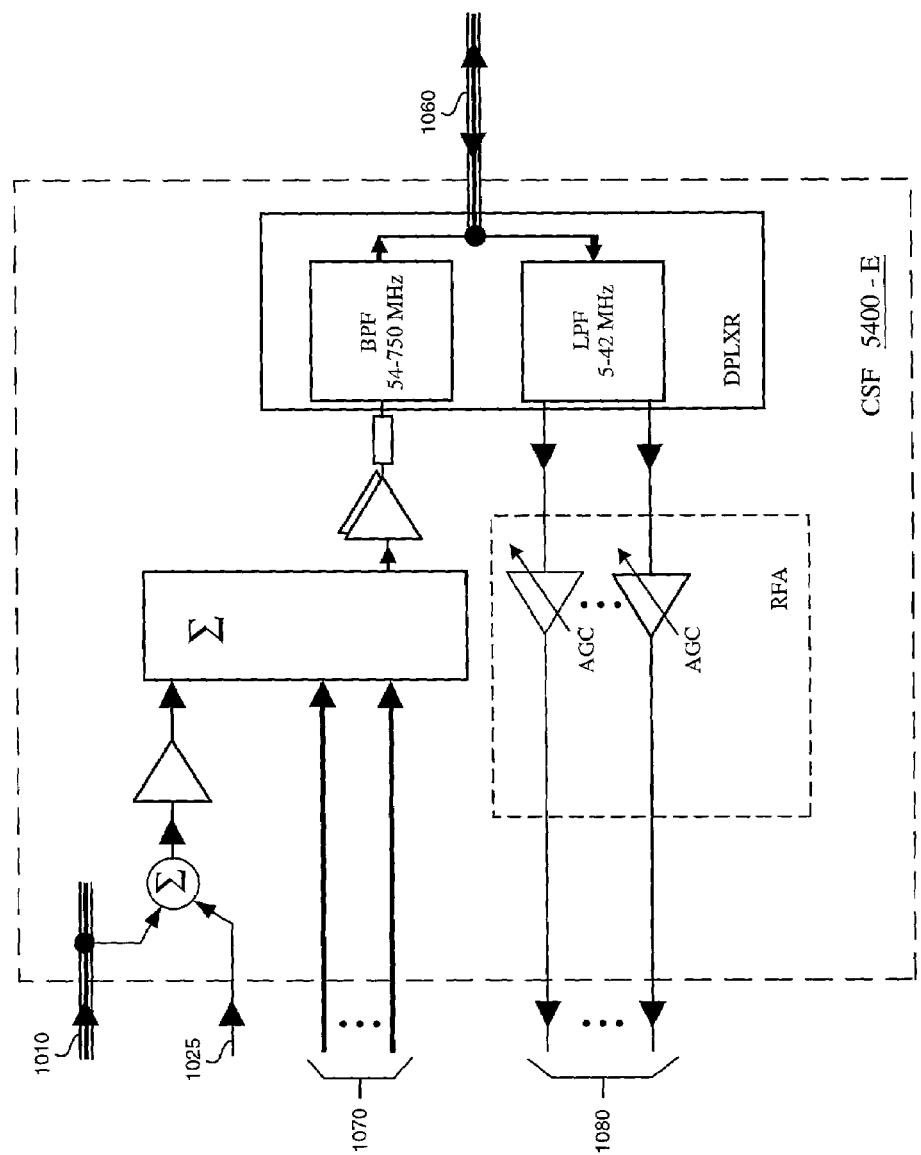
FIG. 2(A) and FIG. 2(B) detail different embodiments of the Combine and Split Function (CSF, 5400), of FIG. 1(A).
Figure 2:
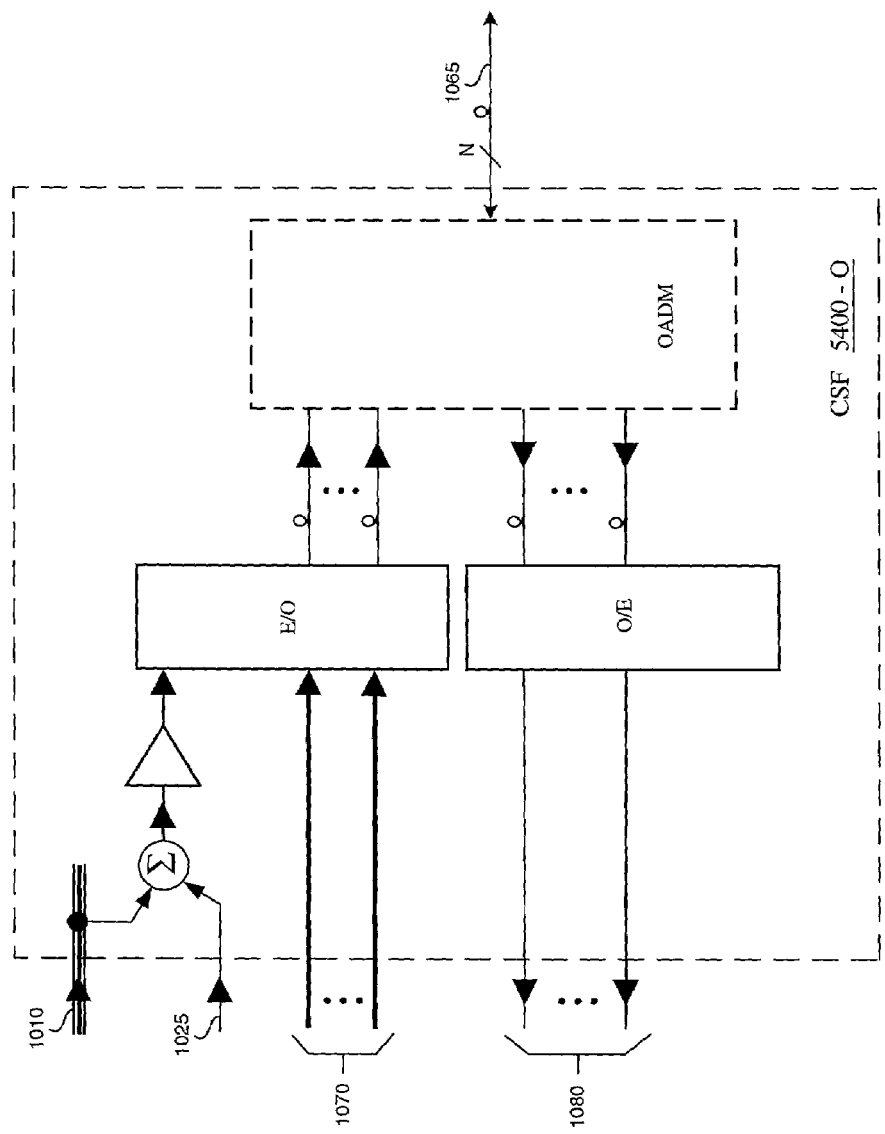

In the illustrative embodiment of FIG. 1(A), an electrical RF interface is used to interface with the network downstream of the CMTS. Depending on the type of system application, and hence the placement of the CMTS within the overall network, the CSF function 5400 will include an optical interface and the appropriate converters, as required. Corresponding to the all-electrical CSF 5400-E of FIG. 2(A), the CSF output 1060 is used when the interface to downstream is electrical, such as is typically the case in last-mile embodiments. Corresponding to the hybrid electrical-optical CSF 5400-O of FIG. 2(B), the CSF fiber output 1065 is used when the interface to the downstream nodes is optical, such as is preferably the case in Head End and intermediate-node embodiments.

In a last-mile embodiment, the CMTS performs processing on downstream packets and converts them to RF-modulated analog signals to present to the subscriber network, as well as converting RF upstream signals to packets for sending over an upstream packet network. With reference again to FIG. 1(A), note that all functionality is partitioned across the cPCI midplane, placing the majority of the CMTS functionality in the cards (100-1 through 100-N, 700 and 800) removably affixed to the front (to the left in FIG. 1(A)) of the midplane 300, and allowing cabling to be made to so-called transition cards removably affixed to the rear (to the right in FIG. 1(A)) of the midplane 300.

Packet transfers with network nodes in the upstream direction are optically coupled to the CMTS via Gigabit Ethernet on fibers 1035 and 1036. The packets are examined by a redundant switch (card RS 700 and its associated transition card RSTC 725), and directed to the various installed Line Cards 100-1 through 100-N via their associated I/O Cards 200-1 through 200-N.

As detailed in the FIG. 1(B) view of the Line Card 100-N, these packets go directly to the MAC processing block 170-N, are then processed by the downstream digital signal processing circuitry DSDSP 160-N to generate a predetermined number, D, of streams of digital samples, each of which are converted to analog IF signals via respective digital-to-analog converters DAC 130-N, and then upconverted within the IF2RF module 110-N to produce respective RF signals 175-N. The D RF signals 175-N pass through the cPCI midplane 300 and the associated I/O Card 200-N. Referring again to FIG. 1(A), under normal operation (optional redundancy circuitry 17 in its normal passthrough state) these same D RF signals emerge from the I/O Card 200-N as downstream signals 1070-N which are coupled to the CSF 5400-E to be combined with downstream signals (from other Line Cards as well as analog broadcast channels coupled via transmission paths 1010 and 1025) and propagated to subscribers via the bi-directional coaxial-cable distribution 1060.

Upstream signals from subscribers on the bi-directional coaxial-cable distribution 1060 are split off from the downstream signals by the CSF 5400-E and presented to the CMTS through upstream transmission lines 1080. These pass through I/O Cards 200-1 through 200-N through the cPCI midplane to their associated Line Cards 100-1 through 100-N.

As shown in more detail in FIG. 1(B), each Line Card accepts a predetermined number, U, of upstream transmission lines (collectively 150), each of which is subsequently sampled by respective ADCs 190. In a preferred embodiment, U=4. Within the upstream digital signal processing USDSP 180, the output stream of each of the 4 ADCs is provided to multiple separate dynamically programmable receivers. In a preferred embodiment, the number of tunable receiver channels per ADC is also 4, coincidentally. The USDPS 180 of the preferred embodiment can thus extract and process data corresponding to 4 separate RF channels per transmission line, or 16 total upstream channels per Line Card 100. The number of Line Cards in a preferred embodiment is 8, corresponding to 128 upstream channels in a non-redundant configuration. (Redundant Line Card configurations are discussed below.)

The extracted channel data is framed and provided to MAC function 170, where it is merged with other channel data, and formatted into packets compatible with Ethernet transmission protocols. The packets from each Line Card 100 are subsequently directed to the upstream network via the redundant switch RS 700 and its associated transition card RSTC 725, discussed previously.

Control and monitoring of various chassis parameters, including numerous forms of Line Card status data, is performed by the Redundant Chassis Control Module RCCM 800 and its associated transition card RCCMTC 825.

Subsystem Partitioning

Figure 6:
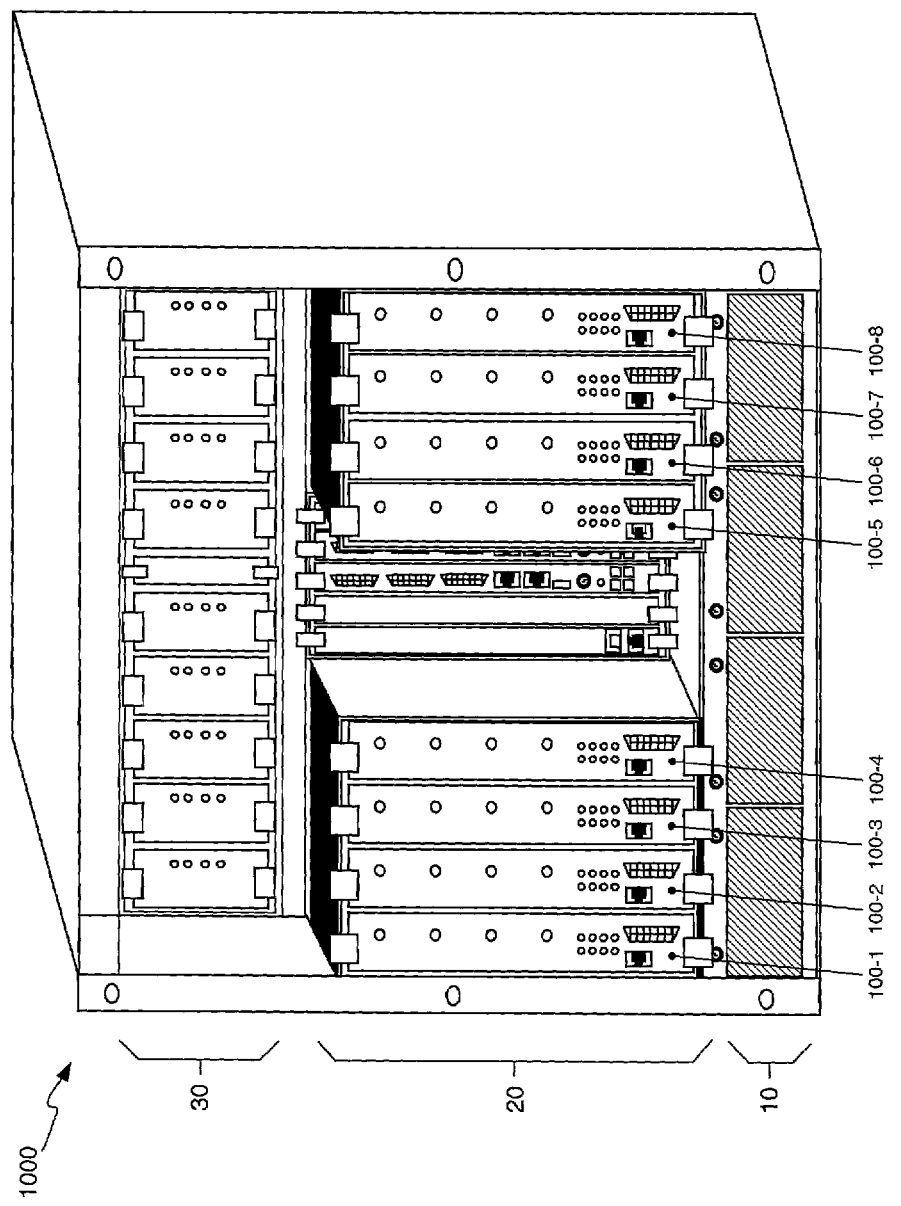
FIG. 6 illustrates an external front view of the CMTS 1000 of FIG. 1, in accordance with the present invention, including Line Cards (100-1 through 100-8).

The invention improves CMTS maintainability by partitioning most processing functions onto Line Cards that do not physically connect directly to external cables. Thus, the Line Cards can be removed from the front of the chassis for servicing without disconnecting any cables. FIG. 6 shows the front of a CMTS 1000 chassis, in accordance with the invention, illustrating the direct access to the Line Cards 100-1 through 100-8 in section 20 of the front panel. Also illustrated is the front panel access to the array of power supplies in the top 30, and the fan grills in the bottom 10 for ventilation.

The Line Cards 100 and I/O Cards 200 interface with each other through a CompactPCI (cPCI) midplane 300, as shown in the CMTS side view in FIG. 7. CompactPCI (cPCI) is a bus structure developed by the PCI Industrial Computer Manufacturer's Group based on the desktop PCI architecture. Line Cards 100 reside in the front of the chassis (the left side of this side view) and connect to the midplane 300 through the J1 through J5 and P1 through P5 connectors. The I/O Cards 200 mount onto the rear (shown here as the right side) of the cPCI midplane through a similar connector mating of RJ1 through RJ5 to P1 through P5. (A closer, top view of the J-P-RJ connection that provides the interface between Line Cards and I/O Cards will be shown in a later drawing, FIG. 12, as indicated.) FIG. 7 also shows the location of other essential CMTS components within the chassis 1100—alarm displays 600, power supplies 500, power connectors and circuit breakers 525, card mounting guides 1110, 1120, 1210 and 1220, and fans 425 and 450.

The Line Card 100 in an illustrative embodiment is comprised of a combination of the cPCI 6U form factor adapter card with a "CMTS PHY (Physical) Card" installed in PMC (PCI Mezzanine Card) Slot 1. The cPCI adapter card supports three PowerPC microprocessors on-board and one MPC8240 Integrated Processor for a total of 4 processors in this illustrative embodiment. Additional computing resources may be added to the Line Card with the installation of a PrPMC (Processor PMC) card in PMC Slot 2.

Figure 9B:
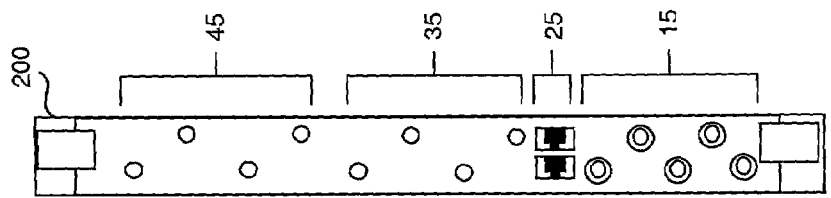
FIGS. 9A and 9B show different views of one of the I/O Cards 200 of FIG. 8.
Figure 9A:
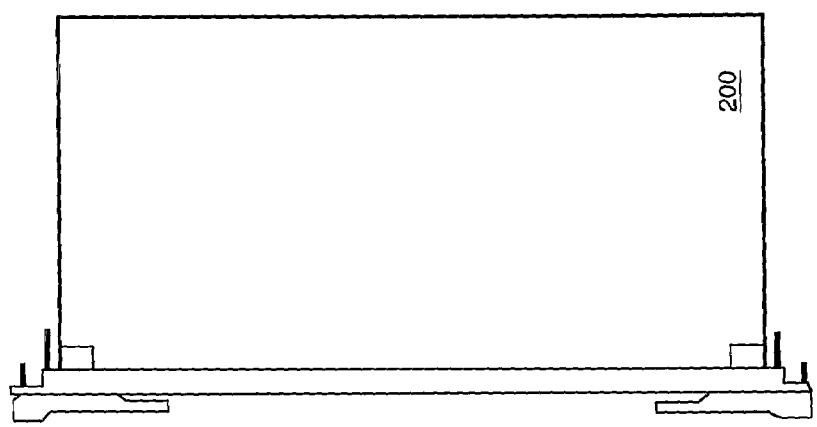

An I/O Card is associated with each Line Card and mounts on the rear side of the cPCI midplane, directly behind each Line Card. This enables all cable connections to be made onto the I/O Cards 200-1 through 200-8 at the rear of the CMTS, as shown in section 50 of the external rear view illustrated in FIG. 8. Also illustrated are again fan grills at the bottom 40, power connectors in section 60, and top fan grills in section 70. Side and rear views of the I/O Card 200 are shown in FIGS. 9A and 9B. The I/O Card provides rear-panel connectors for all traffic-oriented data entering or leaving the Line Card, including the NIC interfaces (2 Ethernet ports, 25 in FIG. 9B), IF/RF Downstream out (4 F connectors 45), RF Upstream in (4 F connectors 35). In a first embodiment, the I/O Card contains only interconnect and no components. In a second embodiment, the I/O Card preferably implements RF relays or switches and related interconnect to implement a backup-bus for support of N+1 redundancy switchover of the IF/RF signals to a designated backup Line Card, as discussed further below.

In other embodiments, the I/O Card incorporates various degrees of video processing circuitry, ranging from video pass-through, to heavy stream processing, to high-bandwidth video distribution. These embodiments will also include MPEG-TS (MPEG-2 Transport System) inputs using 4 DV-ASI connectors 15, as illustrated in FIG. 9B. Some of these later embodiments make use of a modular daughter card having DVB-ASI-compatible video receiver circuitry. Features of the video receiver daughter card preferably include: Support for QAM-64 or QAM-256 signals on each of 4 independent channels, with the QAM-rate being software selectable via an I2C-compatible bus. One of the input port accepts an MPTS+ stream, composed of 4 independent MPEG2 transport stream channels, operating at either QAM-64 or QAM-256. The receiver card recovers each channel's MPEG transport bit stream and timing information. The recovered streams and timing are subsequently coupled from the I/O Card, across the midplane, and to the downstream signal processing of the associated Line Card for DOCSIS multiplexing and modulation.

Serviceability of the CMTS is similarly enhanced for the redundant Chassis Control Modules 800-1 through 800-2 (CCM or Standard cPCI CPU Card) via the presence of a transition module 825-1 through 825-2 that moves cable connections for the CCM to the rear of the CMTS. The CCM card is the controlling element of the chassis. Two such cards monitor the health and status of all modules, and manage the chassis resources. In addition, the CCM may be used to run configuration and management software. The CCM will be able to "read" the Alarms and display such information to the Alarm Card using the I2C bus. The transition module is mostly a 1-to-1 interface from the front connectors of the Chassis Control Module, and presents the mechanical interfaces in the back of the chassis. Such transition module allows cabling removal (Ethernet 10/100BaseT and RS232 used for local and remote system management) that would exist in front of the chassis. The design philosophy is to avoid all cables in front in order to keep all cards really "hot swappable" without interference from encumbering cables.

Figure 10:
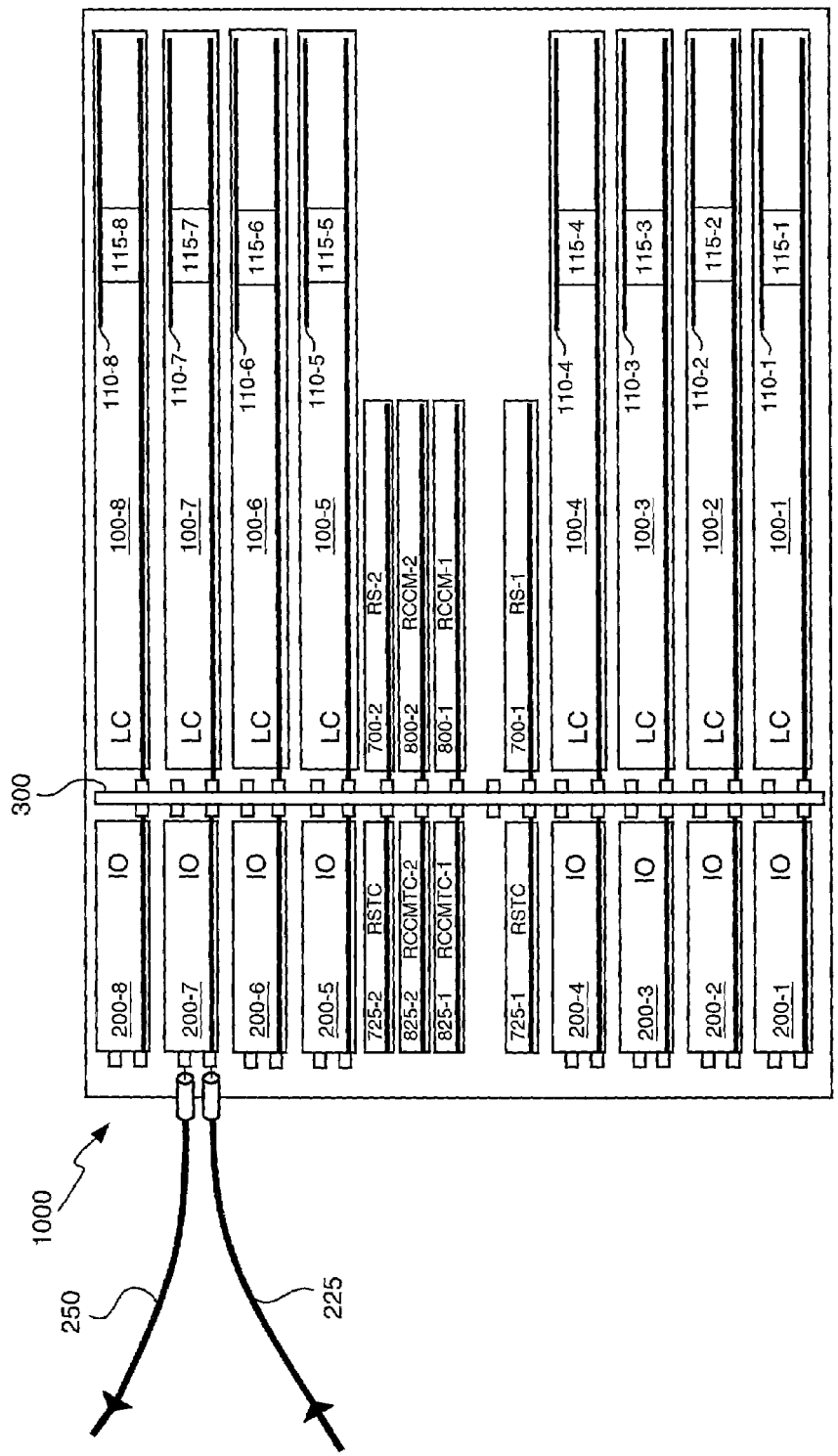
FIG. 10 illustrates an internal top view of the CMTS 1000 of FIG. 6 showing card arrangement and example coaxial-cable connections.

An internal top view of the chassis is represented in FIG. 10, which illustrates the layout and presence of multiple pairs (up to 8) of Line Cards 100-1 through 100-N and I/O Cards 200-1 through 200-N, IF-to-RF modules 110-1 through 110-N mounted directly onto the Line Cards and electrically connected through 115-1 through 115-N, as well as CCM and Network Cards, and representative cable inputs (225 is an upstream signal, 250 downstream).

RF Connector Pass-Through

Figure 11:
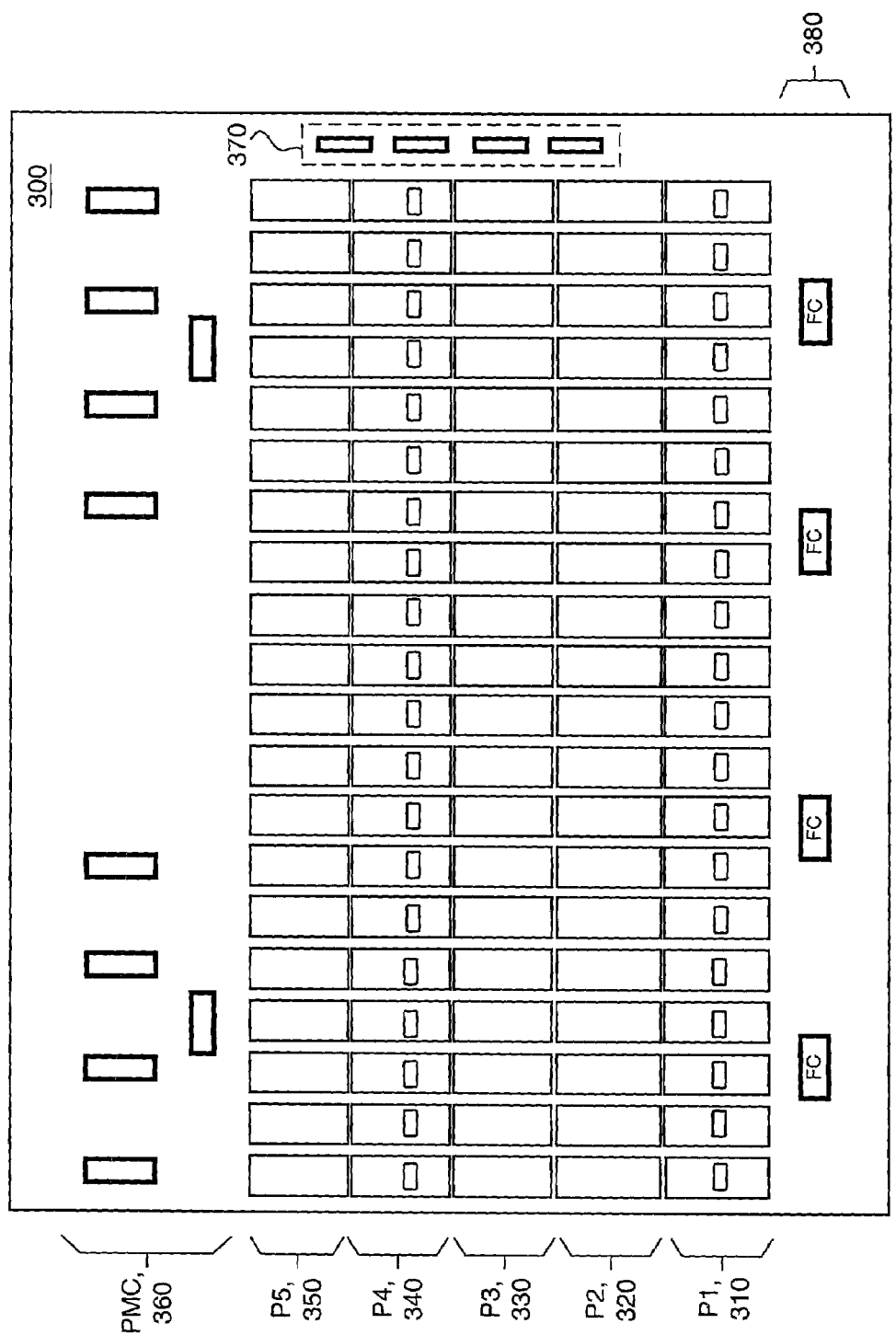
FIG. 11 is a more detailed planar view of the midplane 300, previously shown in cross-section in FIG. 7.

A feature of the invention that facilitates the separation of the I/O Card from the Line Card in an illustrative embodiment is the unique configuration of the pins on the P5/RJ5 355/255 connectors on the cPCI midplane 300. FIG. 11 shows the layout of the cPCI midplane, with P1–P5 connectors 310, 320, 330, 340, 350 for each Line Card and I/O Card pair, 8 48-Pin Connectors and 2 Power Connectors 360, clock and other signal connectors 370, and fan connectors 380. The P5 connector on the midplane carries the IF or RF signals from the Line Cards to the I/O Cards, which deliver them to "F" connectors on the back of the chassis.

Figure 12:
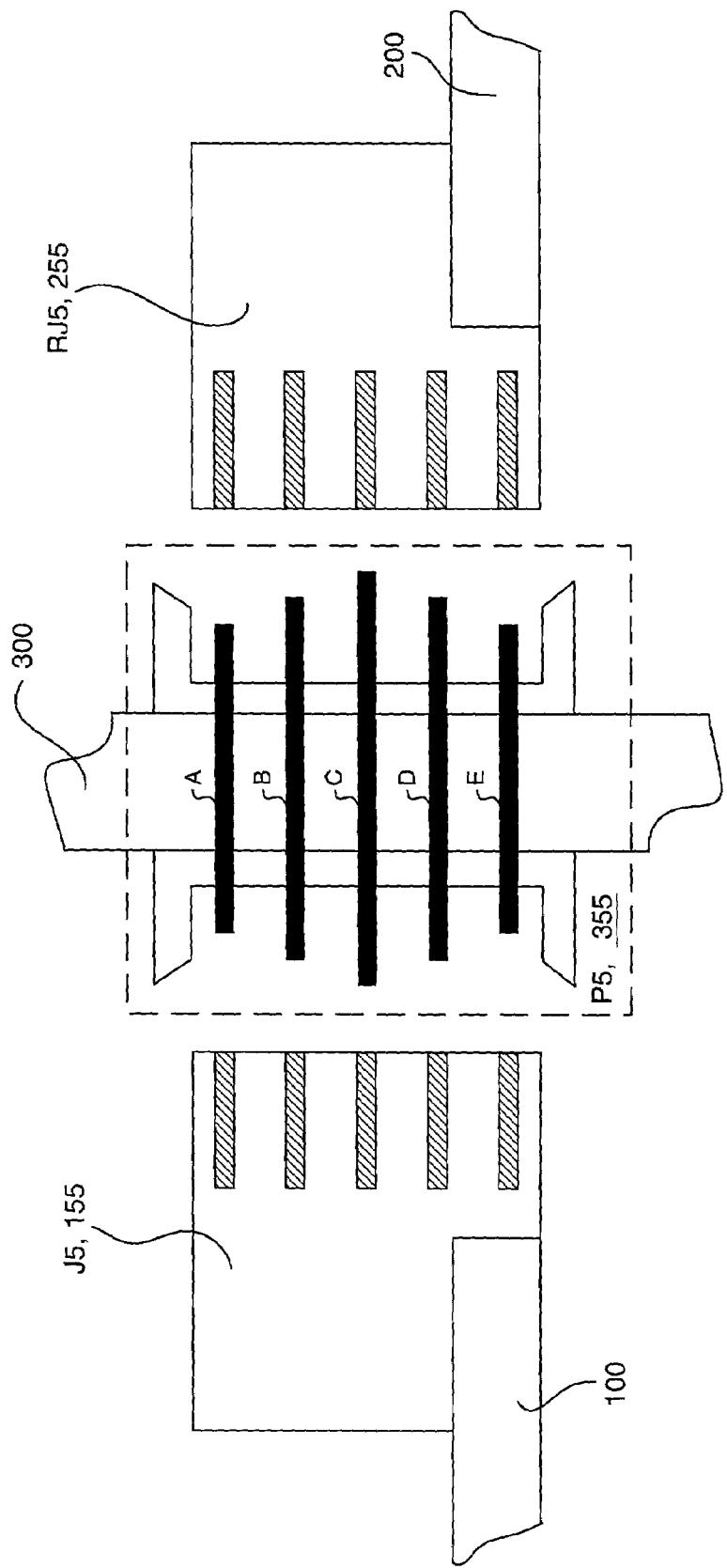
FIG. 12 provides detail of the cross-section through the J5-P5-RJ5 connectors (155, 355, and 255, respectively) of FIG. 7.
Figure 13:
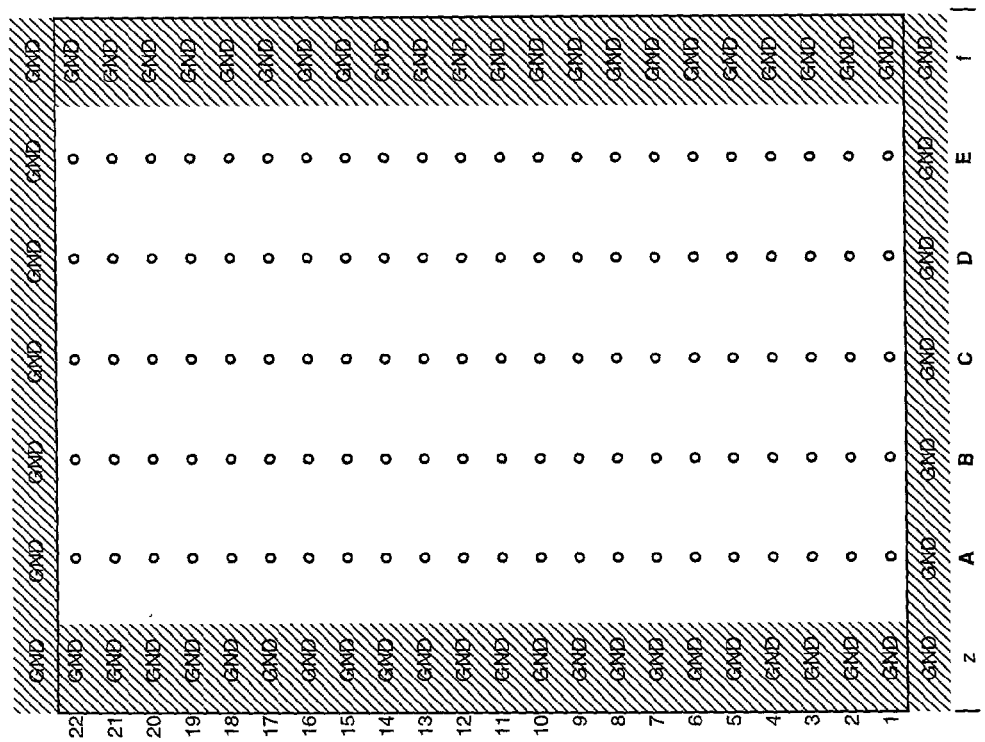
FIG. 13 illustrates the pin array of the male P5 connector 355 of FIG. 7 and its grounded shroud, each pin having annotated row and column Ids.

A top view cross-section of J5/P5/RJ5 connection is illustrated in FIG. 12, showing the 5 columns of female receptacles on the Line Card and I/O Card J5/RJ5 connectors 155 and 255 that connect to the male pins on the cPCI midplane's P5 connector 355. The pin configuration of P5 and the channel arrangement is provided in FIG. 13 (note that this is not drawn to actual physical proportions).

Figures 14A, 14B:
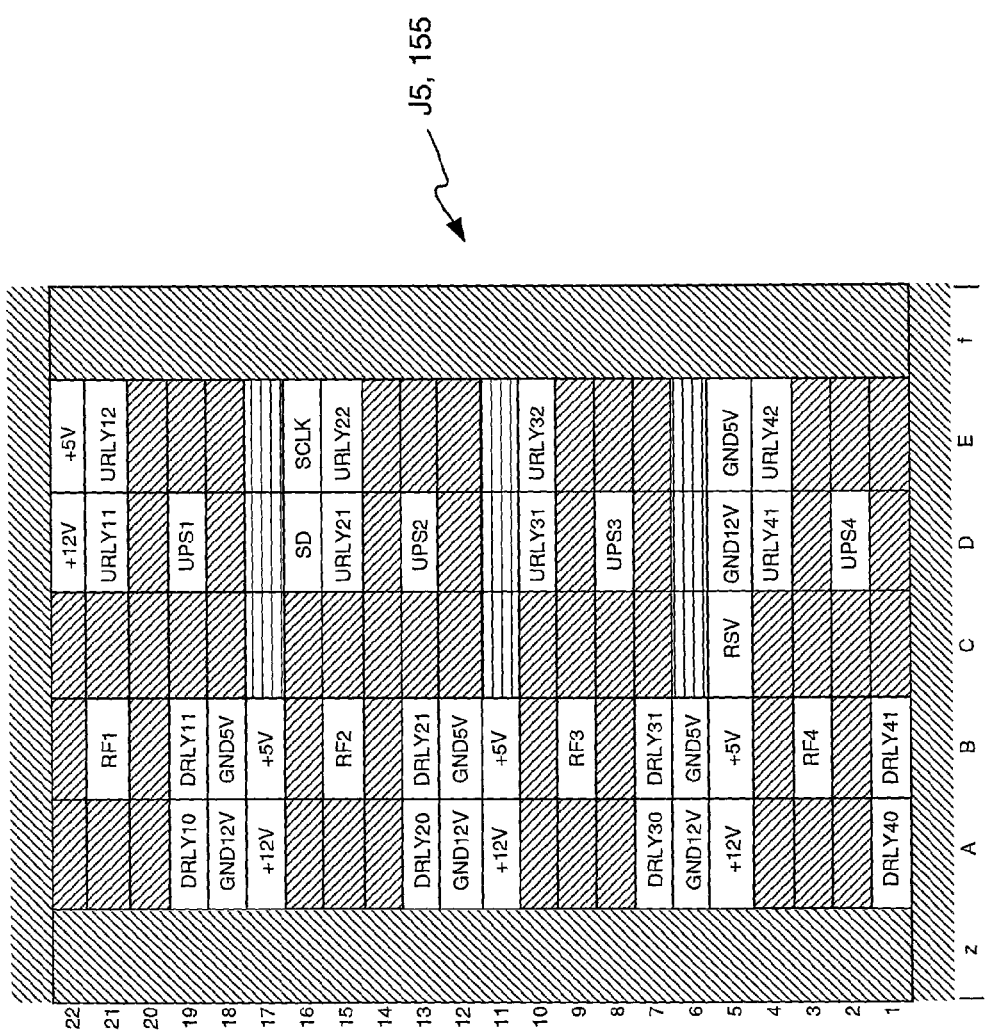
FIGS. 14A and 14B provide detail of the female J5 connector 155.

FIGS. 14A and 14B show pin assignments for the J5 connector. RF1 through RF4 correspond to four downstream IF/RF signal paths. US1 through US4 correspond to four upstream RF signal paths. As shown, the pins surrounding each RF RF signal path are connected to RF Ground, making each downstream and upstream signal path have quasi-coaxial-cable characteristics with impedance close to 75 Ohms.

Figure 15:
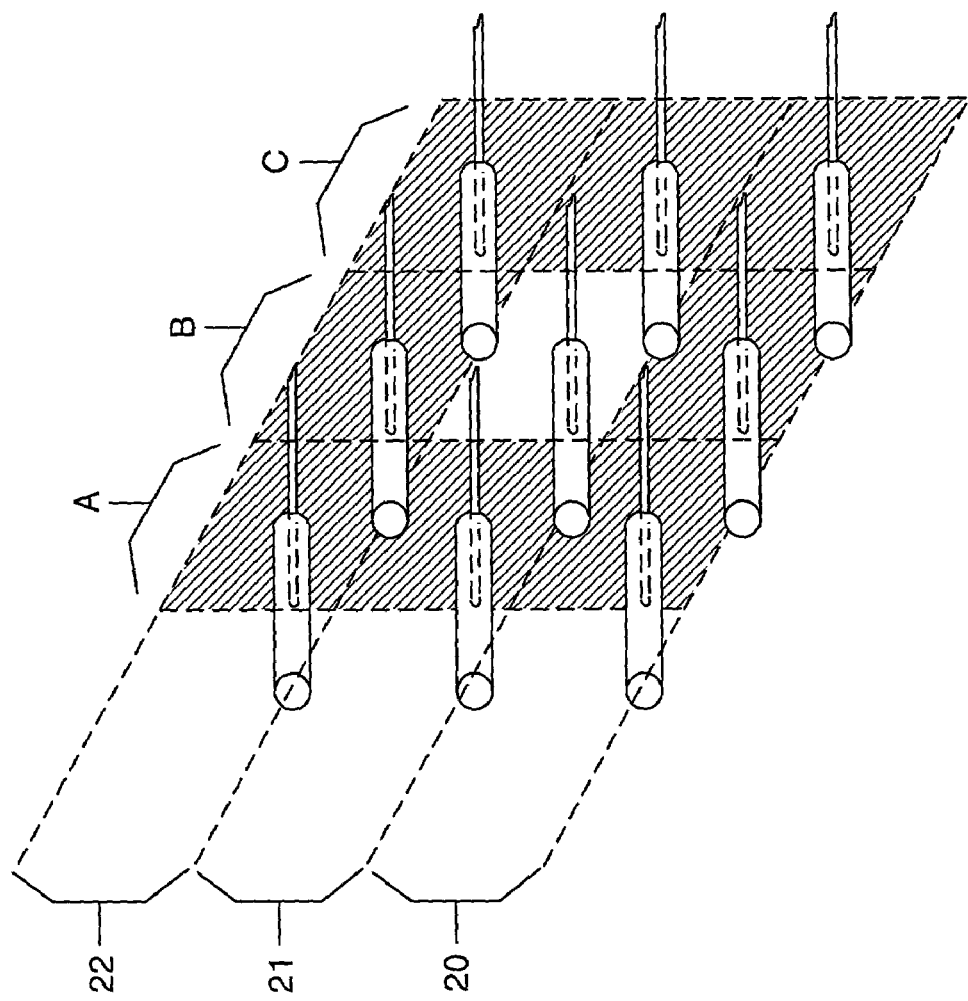
FIG. 15 provides an abstract perspective view, for a subset of nine connector pin-positions, of the mating of the P5 and J5 connectors of FIGS. 13 and 14A. In accordance with the present invention, the nine pins and the corresponding cylindrical receptacles, comprise a quasi-coaxial protected RF interconnect, as the eight outer pins protect the inner ninth pin (at B-21).

Another abstract view for one of the RF signal paths is provided in FIG. 15. Here a set of 9 mated pin-receptacle interconnects are shown that collectively have protective and impedance similarities to a coaxial cable, with the center interconnect carrying the signal and the 8 surrounding interconnects providing ground and shielding. The mated J5-P5-RJ5 connector arrangement has been empirically shown to have a negligible impedance discontinuity, and to provide sufficient shielding to meet DOCSIS 2.0 specifications for channel-to-channel crosstalk under worst-case conditions.

Other pins on the J5 connector of FIG. 14A are used to provide I/O Card power (+5 and +12V), I2C data bus signals (SD) and I2C clock (SCLK). The URLYxx and DRLYxx pins are described in the next section.

Failover Capability

Providing generalized M×N redundancy, especially in the UHF portion of the radio frequency spectrum, is expensive. A preferred embodiment of the CMTS 1000 offers simplified 1×N redundancy, providing automatic failover protection in the case of failure (or other out of tolerance condition) of an individual Line Card. This approach has a significantly reduced cost of implementation compared to the higher redundancy approaches, while providing a high level of benefit.

As described in detail below, upon detection of a failed Line Card, software appropriately configures a Designated Backup (DB) Line Card as a temporary replacement, and RF signals to and from the DB Line Card replace those of the failed card. More specifically, the downstream outputs and upstream inputs of the I/O Card associated with the failed Line Card are automatically uncoupled from the failed Line Card and coupled instead to the Designated Backup Line Card. RF swiches and multiplexers provide the selective coupling.

Solid-state RF switches and multiplexers are available at low cost. Suitable switches for the purposes discussed below are often employed in the cellular telephone industry for the optional provisioning of attenuation in an RF signal path. These switches have insertion losses of under 0.5 dB at 1 GHz and are controllable by means of logic-level signals.

Figure 16:
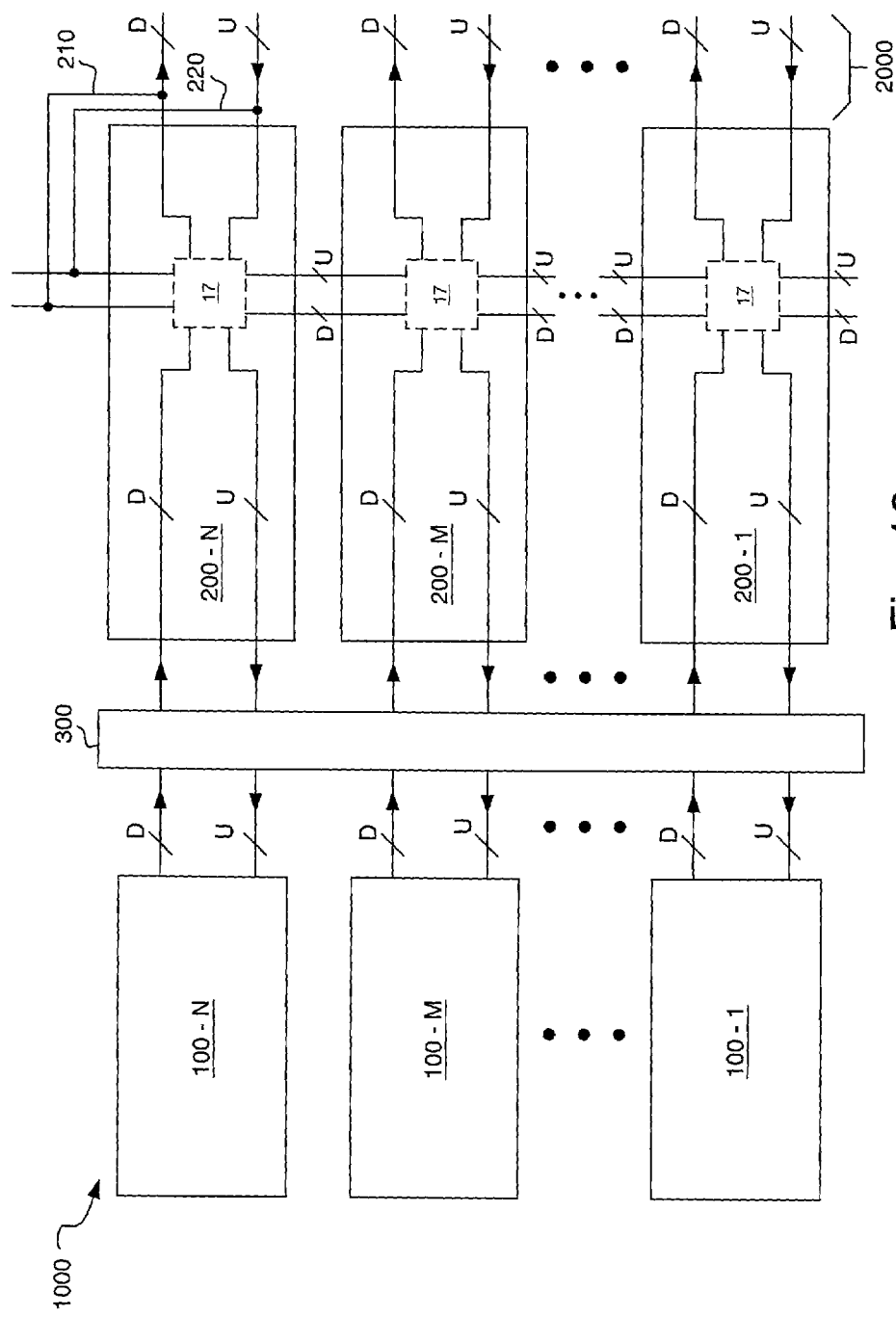
FIG. 16 illustrates how the Line Cards 100, I/O Cards 200, and Midplane 300 of FIG. 1 can be configured to use the Nth Line Card as a Designated Backup (DB).

FIG. 16 illustrates a particular 1×N redundancy embodiment of the CMTS 1000, wherein a number of switch networks 17 are deployed on each of N I/O Cards and interconnected when possible to immediately adjacent (above and below, as applicable) switch networks 17. Cabling 2000 includes up to D downstream cables and U upstream cables associated with each of the lower N−1 Line Cards. The top Line Card 100-N, associated with I/O Card 200-N, is a Designated Backup Line Card. In association with Line Card 100-N's status as the Designated Backup, the switch network 17 of I/O Card 200-N is specially connected to itself via external cabling 210 and 220.

In FIG. 16 a distributed "backup-bus" is formed by the switch network 17 of each I/O Card together with the interconnect associated with the "vertical" downstream and upstream signals between the I/O Cards. Where adjacent I/O Cards exist, there is an "upper card" and "lower card" relationship between any pair of I/O Cards. For each such I/O Card pair, the backup-bus downstream path 1735 of the upper card is coupled to the backup-bus downstream path 1730 of the lower card, and the backup-bus upstream path 1740 of the lower card is coupled to the backup-bus upstream path 1745 of the upper card. (The foregoing uses the up and down sense implicit in the card arrangement shown in FIG. 16, which is an obviously arbitrary directional orientation used as a convenience for purposes of this description.)

Figure 17:
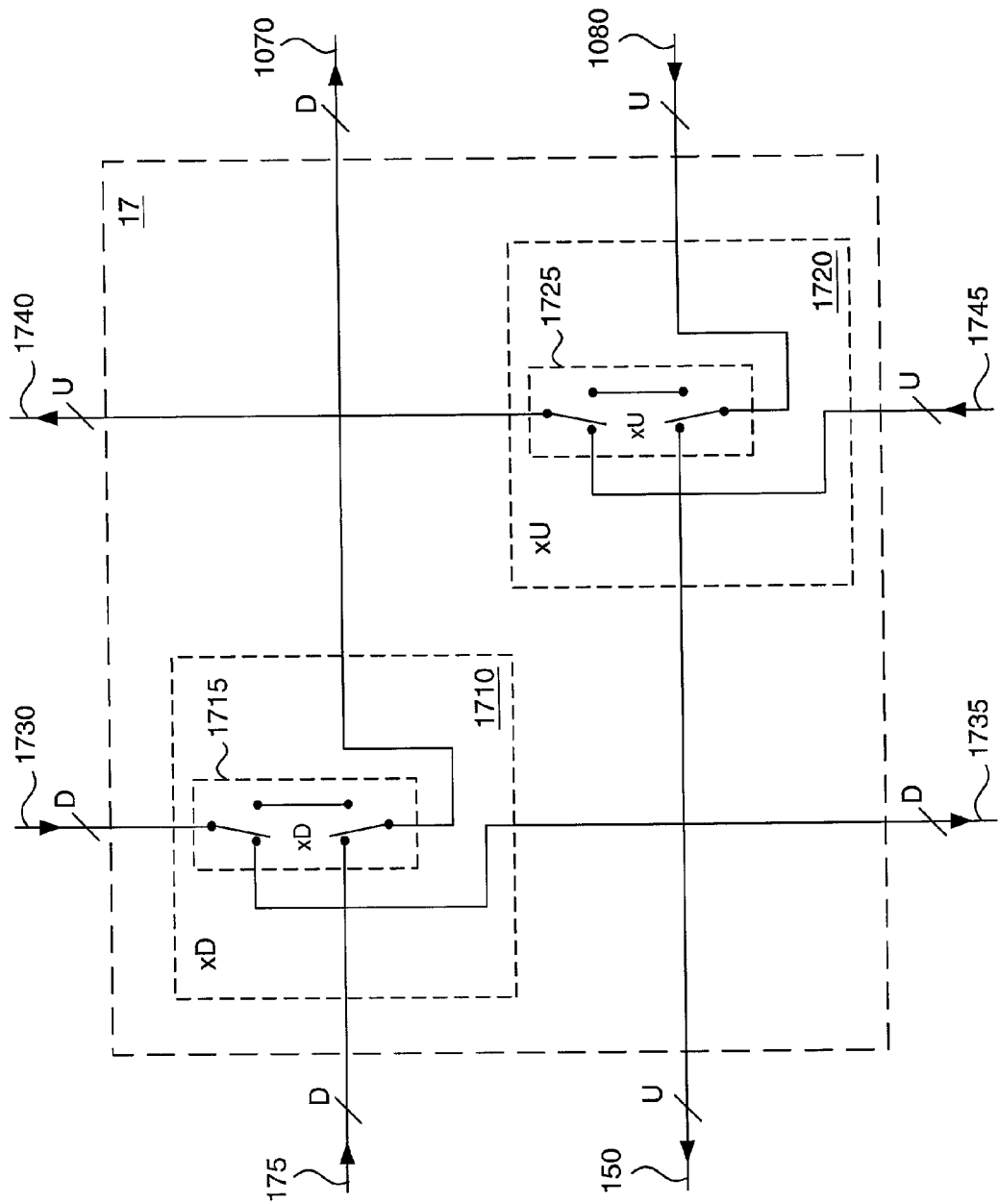
FIG. 17 provides detail of the backup bus network 17, which couples the I/O Cards 200 of FIG. 16.

The functionality of switch network 17 may be understood at a number of different levels of abstraction, corresponding to the various dashed boxes of FIG. 17. Those skilled in the art will understand that the functionality provided at a particular level of abstraction can be implemented in a variety of ways, and the lower levels of abstraction provided in FIG. 17 are merely an illustrative implementation. As illustrated in FIGS. 16 and 17, there are D physical downstream RF interconnects in each downstream path and U physical downstream RF interconnects in each upstream path. In a preferred embodiment, D=U=4. The interconnects are also generally protected in the preferred embodiment, being controlled impedance paths and incorporating some degree of shielding to meet RF crosstalk, emissions, and susceptibility requirements. As discussed elsewhere, up to 4 upstream channels may be processed per physical upstream interconnect.

At the top level, the switch network 17 operates in a pass-through mode in normal operation, wherein the Line Card downstream path is coupled to output downstream path 1070, input upstream path 1080 is coupled to Line Card upstream path 150, backup-bus downstream path 1730 is coupled to backup-bus downstream path 1735, and backup-bus upstream path 1745 is coupled to backup-bus upstream path 1740.

The switch network 17 can be reconfigured to a backup mode (also referred to as the redundant configuration) whenever the associated Line Card fails, wherein backup downstream path 1730 is coupled to output downstream path 1070, input upstream path 1080 is coupled to backup upstream path 1740, and the Line Card downstream path 175 and Line Card upstream path 150 are isolated.

At the lower levels, switch network 17 is composed of separate switching blocks 1720 and 1720, for the downstream and upstream paths, respectively. These blocks include respective switch modules 1715 and 1725 and associated wiring. The ×D (times D) and ×U (times U) notation indicates that these blocks and modules are actually replicated D and U times, respectively. This is consistent with the "slash D" and "slash U" notation used for the downstream and upstream paths, respectively. Those skilled in the art will understand that this permits each of these blocks and modules to be abstractly represented in FIG. 17 using a single instance of each to minimize visual clutter and facilitate illustration of the concept.

The switch modules 1715 and 1725 in FIG. 17 are illustrated with switch positions corresponding to the pass-through mode of operation discussed above. The backup mode is achieved by directing all of the switches to the switch-state opposite that shown. Each of the switch modules 1715 and 1725 is illustrated using two single-pole-double-throw (SPDT) RF switches with logic-level control inputs (not shown, but described next).

The URLYxx and DRLYxx pins (where u and d range from 1 to 4, and s is 0 or 1) of the J5 connector of FIG. 14A correspond to the logic-level switch controls signals. In this illustrative embodiment there are 8 DRLYxx (Downstream ReLaYxx) control signals, where xx is of the form d:s, with d ranging from 1 to 4, and s ranging from 0 to 1. The d identifier specifies the particular downstream path of the D paths and the s identifier specifies the particular switch of the upper and lower switches of the switch module 1715. Similarly, there are 8 URLYxx (Upstream ReLaYxx) control signals, where xx is of the form u:s, with u ranging from 1 to 4, and s ranging from 0 to 1. The u identifier specifies the particular upstream path of the U paths and the s identifier specifies the particular switch of the upper and lower switches of the switch module 1725.

Providing the 4 control signal pairs for upstream control and the 4 pairs for downstream control provides maximum flexibility, but this high degree of control is beyond that required for switching merely between pass-through mode and backup mode. Those skilled in the art will recognize that a wide range of control signal flexibility is possible. Other implementations may well reduce the number of control signals. Depending upon the true/false logic defined for the switch module control inputs, a minimalist implementation could use only one control input, or one pair of complementary control inputs.

Those skilled in the art will further readily appreciate that other routing topologies, using other combinations of various switch types, are readily derived while providing equivalent functionality at the higher levels of abstraction. Furthermore, all of these switches may be implemented at the physical level in a variety of ways.

As a specific example of an alternate implementation (or equally as an alternate perspective on the same functionality), each of the switching blocks 1710 and 1720 can be implemented as a combination multiplex and switch function. Specifically, switch block 1710 can be viewed as implementing a multiplexer having paths 175 and 1730 as inputs and path 1070 as an output. An additional switch provides the selective coupling of the path 1730 to path 1735. Similarly, switch block 1720 can be viewed as a multiplexer having paths 1080 and 1745 as inputs and path 1740 as an output. An additional switch provides the selective coupling of the path 1080 to path 150.

The interconnect topology provided by 210 and 220 in FIG. 16 allows a common I/O Card to be used in all I/O Card slots of the CMTS. Commonality of parts has well known serviceability and economic benefits. Those skilled in the art will recognize that for the 1×N redundancy configuration taught in this section, no switch network is required for the I/O Card associated with the Designated Backup. That is, with reference to FIG. 17, it would be sufficient to directly couple backup downstream signals 175 as signals 1735 and likewise couple signals 1745 as backup upstream signals 150. Such an approach would also eliminate the external cabling.

Those skilled in the art will also recognize that if redundancy is not needed, the switch network 17 may be done away with entirely, replaced by pass-through interconnect, such that Line Card downstream path 175 is always coupled to output downstream path 1070 and likewise input upstream path 1080 is always coupled to Line Card upstream path 150. In such a non-redundant embodiment, the backup-bus card-to-card interconnect between I/O Cards would not be provided.

A number of options also exist for the card-to-card interconnects comprising the backup-bus. In a first embodiment they are controlled-impedance traces on the midplane. In a second embodiment, miniature cables and surface-mount connectors are used, with multiple "flying leads" between the I/O Cards. In variations of the second embodiment, miniature multi-pin coaxial connectors and/or multi-coaxial "flat cables" may be employed, to reduce the number of individual connectors and flying leads.

The difficulties of dealing with the card-to-card interconnects is offset by the very attractive fact that all backup services are provided within the envelope of the one card cage; no additional external equipment or cables are required. Various degrees of redundancy can be offered simply by choosing how many Line Cards to group, with one of the group being the "designated Backup".

When the Chassis Control Module (CCM) determines that a Line Card is not operating properly, it coordinates the switchover to the Backup Line Card. In an illustrative embodiment, an "RF present" signal (or the logical compliment, RF absent) may be derived from each downstream signal line, and made available for reading via an I2C-compatible interface. This need not be an accurate measure of RF power, but merely a "yes or no" indication of the presence of the RF signal. In a preferred embodiment, the CCM monitors several status data concerning an operational Line Card, including IF or RF output levels, operational status of all processors, ASICs, IF-to-RF upconvertors, 100BaseT interfaces, the serial RS-232 interface, and any alarm events related to any operational parameter being outside of limits or any fault condition.

The Chassis Control Module (CCM) handles control of the switch network 17. As indicated previously, there is no need to switch each RF path independently. In the illustrative embodiment, all eight paths are switched simultaneously between pass-through mode and backup mode, using a single command. The commands are sent along one of two midplane-carried I2C buses (one for each half of the total backplane width). The I2C address of each switch controller is determined solely by the physical position of the card within each half of the card cage. No jumpers or switches are used for this purpose; plugging an I/O Card into a specific position on the midplane is sufficient.

The I/O Card supports operation of the backup bus whether or not the Line Card is in place. Accordingly, the I2C switch drivers derive power directly from the midplane, and not the "frontside" Line Card. The default power-on state of the switches places the switch network 17 in the pass-through mode.

To enable proper activation of a Backup Line Card, the Chassis Control Module stores the state information of all Line Cards and Network Cards in the chassis. The maximum amount of data is estimated to be 200 megabytes. Upon the need for redundant switchover of a Line Card, the chassis control module transfers the latest state information of the failed card to the Designated Line Card before actually activating the backup card for primary operation.

Line Card Modularity

Figure 18:
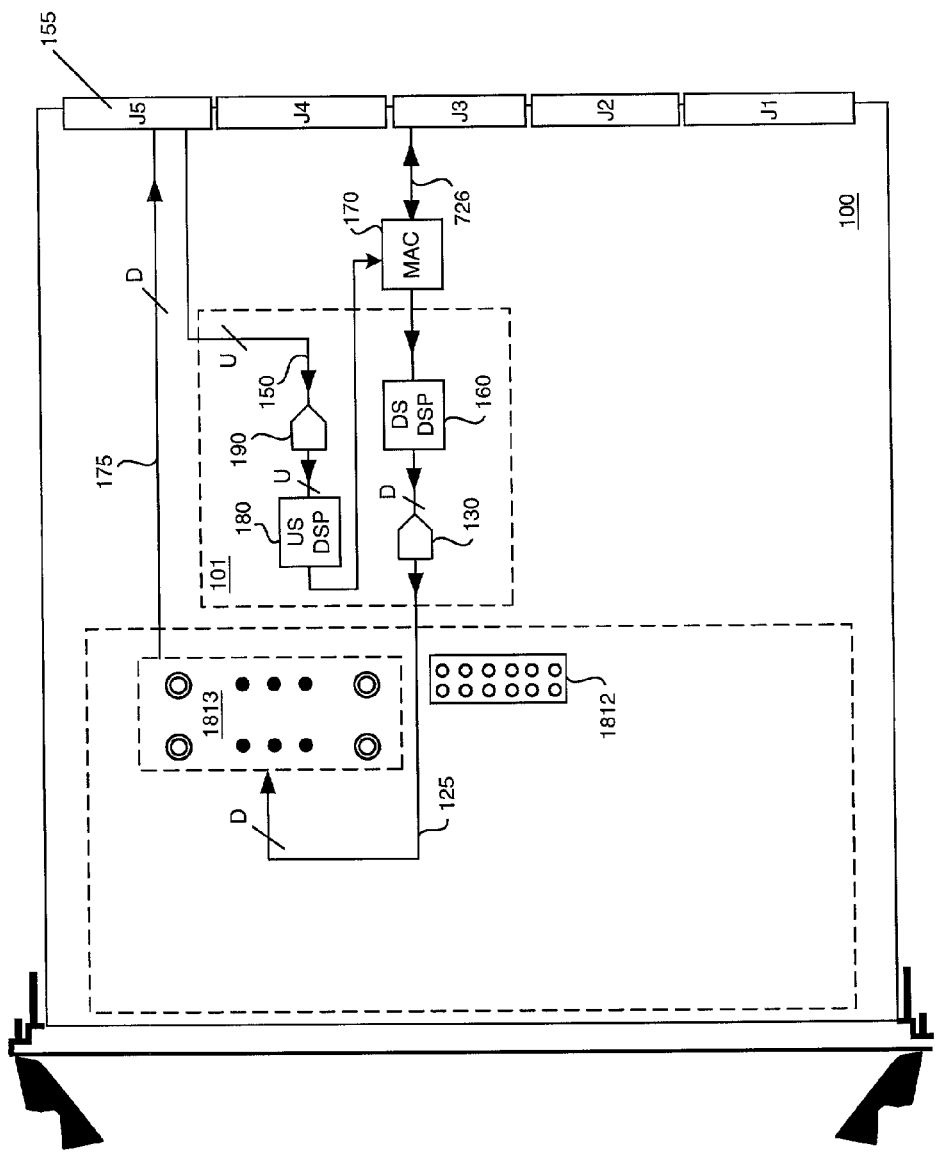
FIG. 18 illustrates a first embodiment of the Line Card 100 of FIG. 1, showing lands for the IF-to-RF module of FIG. 19.

In the preferred embodiment of this invention the Line Cards are further partitioned into easily replaceable sections, including a detachable module for optional IF-to-RF functionality and a detachable daughter card for the signal processing functions, to make a single module for easy hot swap and maintenance. This configuration is depicted in FIG. 18. The IF2RF module (the large dotted-line rectangle on the left) receives analog IF downstream signals 125 through complementary pairs of push-on-mating (including slide-on and snap-on, and preferably self-aligning) coaxial connectors, one set 1813 on the Line Card and one set 1913 on the IF-to-RF module. These signals 125 are created by digitally processing (DSDSP 160) information coming from packet OADM interfaces or Video Server inputs 1050 and then converting those signals to IF (D/A convertors 130). The IF2RF module then acts as upconvertor, preparing that IF signal for delivery to the subscriber line 175. FIG. 18 also shows the processing of the upstream signal (which does not use the IF2RF module). The upstream RF signal is passed from the I/O Card to the Line Card through its J5 connector, becoming signal 150. This signal is digitized by the A/D convertor 190 and then digitally processed (USDSP 180) and run through various MAC functions before being routed as packets upstream 726. Item 1812 depicts the I2C/Power Connectors for the card.

Figure 19B:
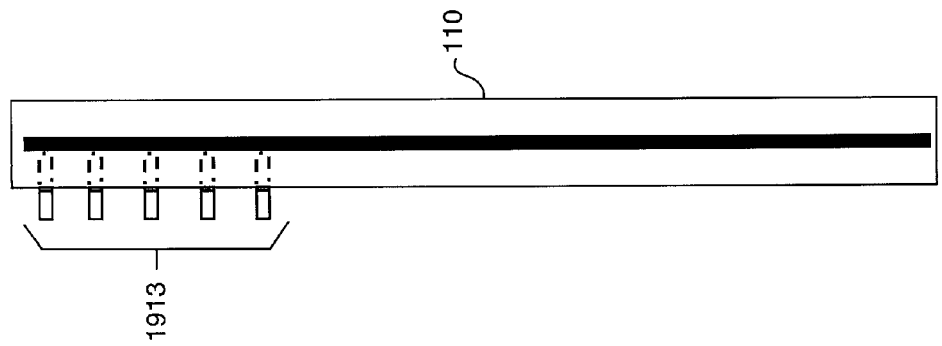
FIGS. 19A and 19B illustrate a bottom view (FIG. 19A) and a cut-away side view (FIG. 19B) of an IF-to-RF module 110 that is mountable on the Line Card 100 of FIG. 18.
Figure 19A:
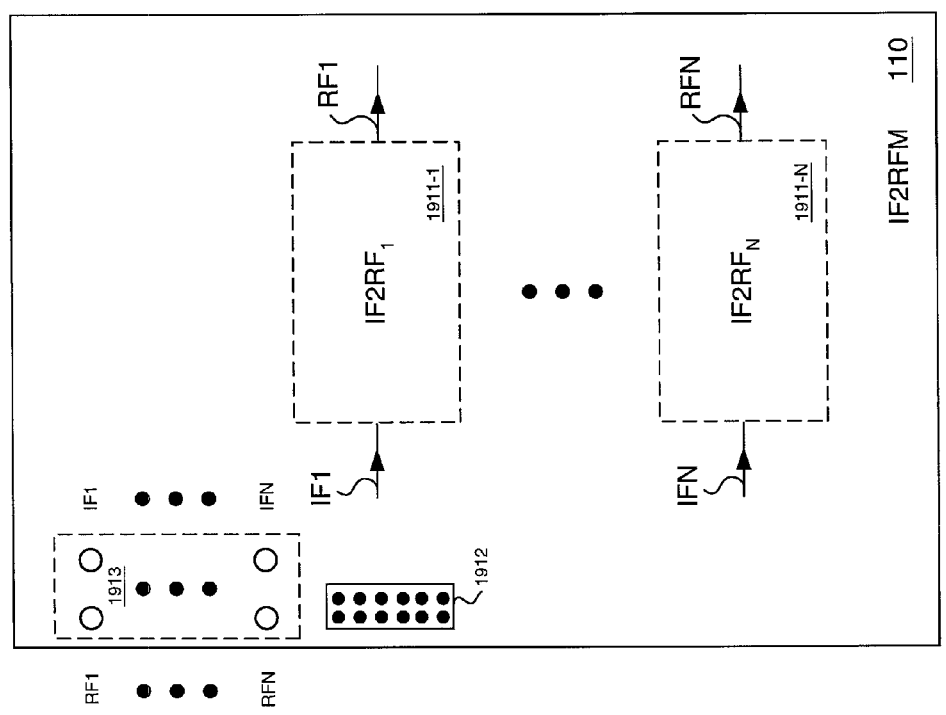

Layout of the IF-to-RF module 110 is shown in FIG. 19A, indicating multiple IF to RF convertors 1911-1 through 1911-N on a single module, their various IF and RF interface connections, and the I2C and Power Connectors 1912. The side view shown in FIG. 19B illustrates the connectors 1913 that connect to mates on the Line Card.

Figure 20B:
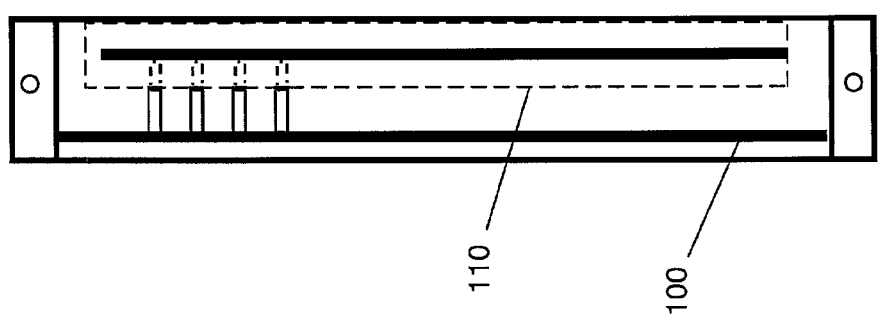
FIGS. 20A and 20B illustrate cut-away rear views of the Line Card 100 of FIG. 18.
Figure 20A:
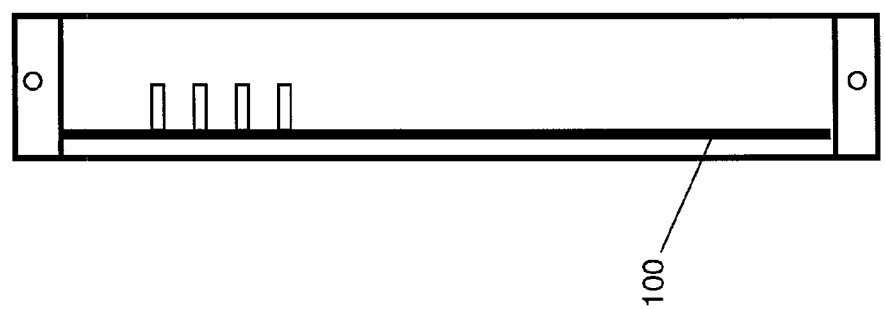
Figure 21:
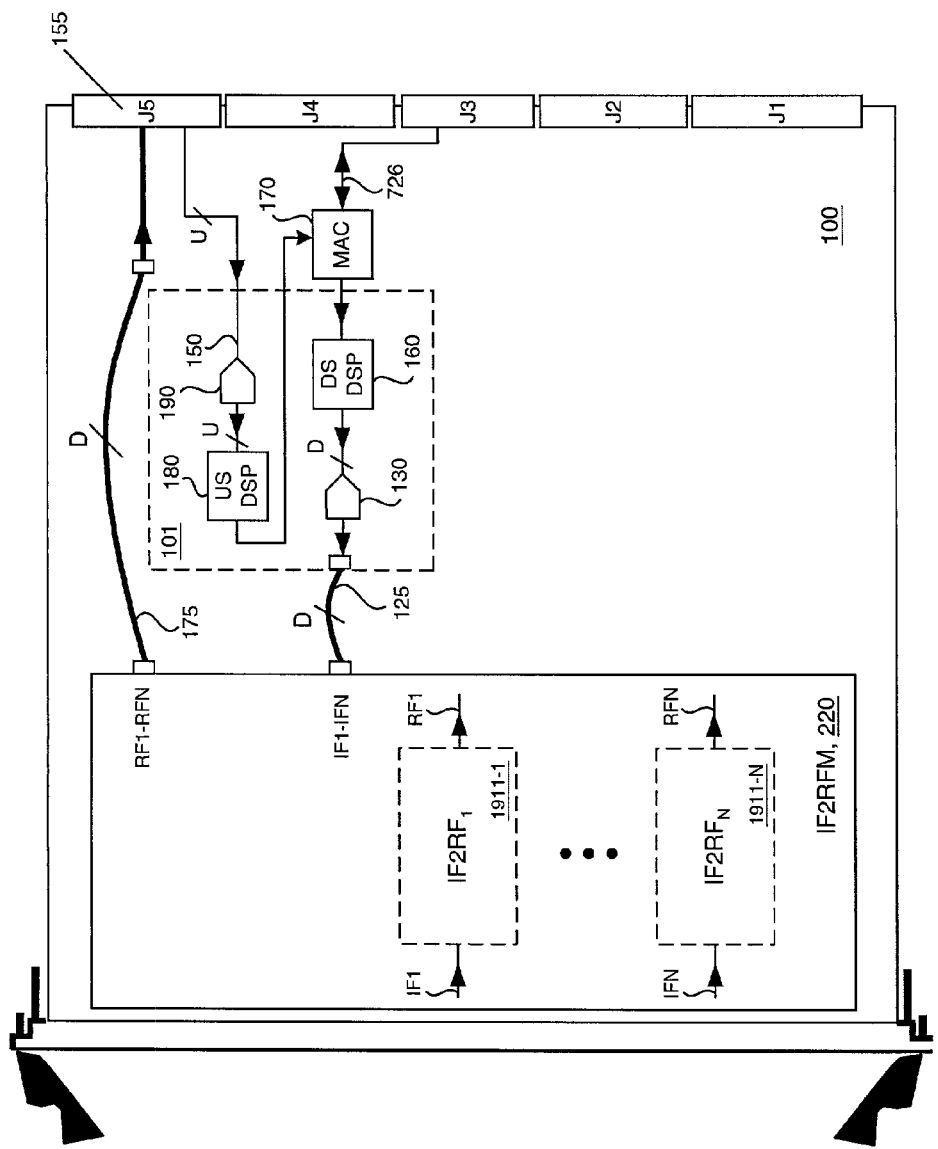
FIG. 21 illustrates an alternate embodiment to that of FIGS. 18 through 20, wherein an IF-to-RF module 220 is coupled to the Line Card 100 of FIG. 1 using cables.

In the preferred embodiment, this is implemented using complementary pairs of push-on-mating (including slide-on and snap-on, and preferably self-aligning) coaxial-connectors. FIGS. 20A and 20B demonstrate different stages of assembly. FIG. 20A shows a Line Card with no IF-to-RF module, while FIG. 20B shows an IF-to-RF module mounted on the Line Card of FIG. 20A. The IF-to-RF module is separately physically retained. An alternate embodiment of the IF-to-RF module, shown in FIG. 21, provides electrical connection through cables. This latter embodiment reduces component costs at the expense of increased time and labor to accomplish the interconnection of the IF-to-RF module with the Line Card.

Dynamic Channel Assignment

To minimize the need for technician-performed channel adjustments, the invention incorporates circuitry that enables the channel assignments to be programmed dynamically, based on internal computations or instructions from the head-end. Thus the channels assigned to an individual IF-to-RF upconverter and its associated upstream digital demodulator can be altered dynamically for noise abatement or other reasons.

Line Card Servicing

Figure 22:
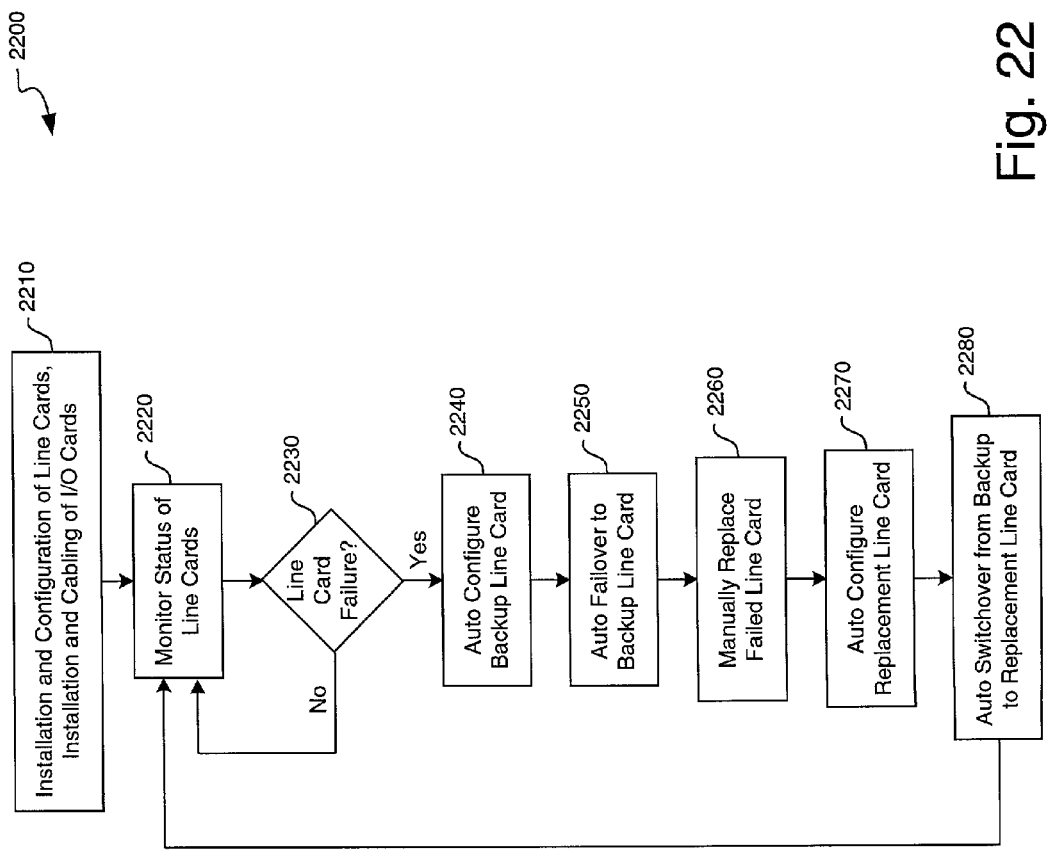
FIG. 22 illustrates steps in an illustrative procedure 2200 for servicing a Line Card 100 in the CMTS 1000 of FIG. 16, without recabling, and in accordance with the invention.

The course of events associated with failure of a Line Card in the present invention is described by Method 2200, which is illustrated in FIG. 22. The beginning Step 2210 is established by installing and configuring the Line and I/O Cards in the chassis and connecting all associated cables to their appropriate places on the I/O Cards. In Step 2220, chassis monitoring and control circuitry continuously records the state information of all Line Cards. In the event of a Line Card failure (detected within the decision box of Step 2230), this state information is used in Step 2240 to setup and configure the Designated Backup Line Card. Once the backup is configured, the control circuitry switches the affected datastreams over to the backup card and sets appropriate alarms in Step 2250. Servicing of the CMTS then begins in Step 2260 with removal and replacement of the affected card. Once the new card is installed, the control circuitry then configures the state data on the new Line Card in Step 2270, and switches the datastreams from the Designated Backup card back to the new Line Card in Step 2280. At no point subsequent to the initial installation is it necessary to manipulate any of the cables.

Conclusion

Although the present invention has been described using particular illustrative embodiments, it will be understood that many variations in construction, arrangement and use are possible consistent with the teachings and within the scope of the invention. For example, interconnect and function-unit bit-widths, clock speeds, and the type of technology used may generally be varied in each component block of the invention. Also, unless specifically stated to the contrary, the value ranges specified, the maximum and minimum values used, or other particular specifications, are merely those of the illustrative or preferred embodiments, can be expected to track improvements and changes in implementation technology, and should not be construed as limitations of the invention. Functionally equivalent techniques known to those skilled in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

Specific variations within the scope of the invention include, but are not limited to: the use of means other than CompactPCI midplanes to provide Line Card and I/O Card separation, including the use of self-adjusting push-on-mating connectors where size and cost are not an object; the use of other types of connectors to provide easy mounting and disassembly of the IF-to-RF module onto and off of the Line Card; implementations carrying different numbers of upstream and downstream signals on a given Line Card; and separation of Line Card and I/O Card functionality for Line Cards that do not provide the ability to dynamically assign and adjust receiver channels. In addition, the primary embodiment illustrated has been the application of the invention in a last-mile embodiment. It is recognized that the invention is similarly applicable within intermediate embodiments or head end embodiments.

All such variations in design comprise insubstantial changes over the teachings conveyed by the illustrative embodiments. The names given to interconnect and logic are illustrative, and should not be construed as limiting the invention. It is also understood that the invention has broad applicability to other telecommunications applications that process and pass RF signals, for enhancing their Reliability, Availability and Serviceability (RAS), and is not limited to the particular application or industry of the illustrated embodiments. The present invention is thus to be construed as including all possible modifications and variations encompassed within the scope of the appended claims.

We claim:

1. A Cable Modem Termination System (CMTS), for coupling via separately provided cables to a network, the CMTS comprising:
   a) a chassis having at least a first and a second card interface, said chassis having electrical paths for coupling signals between said first and said second card interface, said signals including a plurality of RF signals;
   b) at least one I/O Card, said I/O Card having a connector interface for coupling to the network via the cables, said I/O Card having a first chassis interface for mating with said first card interface; and
   c) at least one Line Card having CMTS processing functionality, said Line Card having a second chassis interface for mating with said second card interface, wherein said Line Card may be mated and unmated from the chassis independent of the cables coupling the I/O Card to the network such that in a single action a plurality of RF signals are simultaneously coupled and uncoupled, respectively, the second card interface and the second chassis interface using multi-pin connectors having in cross-section an array of conductors, and each RF signal in the array being surrounded by protective RF grounds.

2. The CMTS of claim 1, wherein the chassis includes a midplane to which said first and second card interface are mounted.

3. The CMTS of claim 2, wherein the first and second card interface are mounted on opposite sides of said midplane.

4. The CMTS of claim 3, wherein the first and second card interface share common parts.

5. The CMTS of claim 1, wherein the second card interface includes a rectangular multi-receptacle jack and the second chassis interface includes a rectangular multi-pin plug.

6. The CMTS of claim 5, wherein RF ground pins are used to protectively surround each RF signal on the rank, file, and diagonals.

7. The CMTS of claim 6, wherein at least 9 connector pins are associated with the coupling of each protected RF signal.

8. The CMTS of claim 6, wherein each connector couples a plurality of protected RF signals.

9. The CMTS of claim 8, wherein RF ground pins are shared in common by at least two of said plurality of protected RF signals.

10. The CMTS of claim 6, wherein the rectangular multi-pin connectors are compatible with the compact-PCI (cPCI) standard.

11. The CMTS of claim 7, wherein the second card interface is a cPCI J5 connector and the second chassis interface is a cPCI P5 connector.

12. The CMTS of claim 11, wherein said connectors present a negligible impedance discontinuity when coupling the protected RF signals in a 75-ohm transmission system.

13. A Cable Modem Termination System (CMTS), for coupling via separately provided cables to a network, the CMTS comprising:
   a chassis including at least a first card interface and a second card interface, the chassis including electrical paths for coupling signals between the first card interface and the second card interface, the signals including a plurality of RF signals;
   at least one I/O card, the I/O card including a connector interface for coupling to the network via the cables, the I/O card including a first chassis interface for mating with the first card interface; and
   at least one Line Card including CMTS processing functionality, the Line Card including a second chassis interface for mating with the second card interface, the Line Card being configured to mate and unmate from the chassis independent of the cables coupling the I/O Card to the network, the Line Card including a detachable IF-to-RF module.

14. The CMTS of claim 13, wherein the IF-to-RF module couples to the Line Card via a plurality of coaxial connectors that are simultaneously mated and unmated when the IF-to-RF module is attached and detached, respectively.

15. The CMTS of claim 13, the IF-to-RF module being configured to transmit RF signals to the Line Card via a plurality of coaxial cables.

16. A Cable Modem Termination System (CMTS), for coupling via separately provided cables to a network, the CMTS comprising:
   a chassis including at least a first card interface and a second card interface, the chassis including electrical paths for coupling signals between the first card interface and the second card interface, the signals including a plurality of RF signals;
   at least one I/O card, the I/O card including a connector interface for coupling to the network via the cables, the I/O card including a first chassis interface for mating with the first card interface; and
   at least one Line Card including CMTS processing functionality, the Line Card including a second chassis interface for mating with the second card interface, the Line Card being configured to mate and unmate from the chassis independent of the cables coupling the I/O Card to the network, the Line Card including a detachable signal processing module.

17. The CMTS of claim 16, wherein the detachable signal processing module includes upstream and downstream digital signal processing functions.

18. The CMTS of claim 16, wherein the detachable signal processing module includes analog-to-digital converters and digital-to-analog converters.

19. A Cable Modem Termination System (CMTS), for coupling via separately provided cables to a network, the CMTS comprising:
   a chassis including at least a first card interface and a second card interface, the chassis including electrical paths for coupling signals between the first card interface and the second card interface, the signals including a plurality of RF signals;
   at least one I/O Card, the I/O Card including a connector interface for coupling to the network via the cables, the I/O Card including a first chassis interface for mating with the first card interface;
   at least one Line Card including CMTS processing functionality, the Line Card including a second chassis interface for mating with the second card interface, the Line Card being configured to mate and unmate from the chassis independent of the cables counling the I/O Card to the network; and
   a packet network interface, said packet network interface being coupled to said Line Card via said I/O Card, said packet network interface also being coupled to the network, the packet network interface including a switch for selectively coupling the Line Card to the network.

20. The CMTS of claim 19, wherein the switch is a redundant switch.

21. The CMTS of claim 19, wherein the switch is coupled to the Line Cards via twisted-pair Ethernet.

22. The CMTS of claim 19, wherein the switch is coupled to the network via at least one optical fiber.

23. The CMTS of claim 19, wherein the switch functionality is partitioned into a first switch card and a second switch card, each for mounting on the chassis, said first switch card being cabled to each of the plurality of Line Cards, the second switch card being coupled to the first switch card via the chassis, and wherein said second switch card can be coupled to and uncoupled from the first switch card independent of said cabling between said first switch card and said Line Cards.

24. The CMTS of claim 19, further including a chassis control module (CCM) for monitoring the status of CMTS subsystems and allocating CMTS resources, said CCM being coupled to a plurality of Line Cards and the network via the packet network interface.

25. The CMTS of claim 24, wherein the CCM is a redundant CCM (RCCM).

* * * * *